US012513022B2

(12) United States Patent
Liu et al.

(10) Patent No.: US 12,513,022 B2
(45) Date of Patent: Dec. 30, 2025

(54) PACKET PROCESSING METHOD, DEVICE, SYSTEM, AND STORAGE MEDIUM

(71) Applicant: Huawei Technologies Co., Ltd., Shenzhen (CN)

(72) Inventors: Bing Liu, Beijing (CN); Shuping Peng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 631 days.

(21) Appl. No.: 17/936,593

(22) Filed: Sep. 29, 2022

(65) Prior Publication Data

US 2023/0043721 A1 Feb. 9, 2023

Related U.S. Application Data

(63) Continuation of application No. PCT/CN2021/078660, filed on Mar. 2, 2021.

(30) Foreign Application Priority Data

Mar. 31, 2020 (CN) .......................... 202010245961.4

(51) Int. Cl.
*H04L 45/16* (2022.01)
*H04L 12/46* (2006.01)
(Continued)

(52) U.S. Cl.
CPC .......... *H04L 12/4633* (2013.01); *H04L 45/00* (2013.01); *H04L 45/74* (2013.01); *H04L 69/324* (2013.01); *H04L 12/4641* (2013.01)

(58) Field of Classification Search
CPC ..... H04L 12/4633; H04L 45/00; H04L 45/74; H04L 69/324; H04L 12/4641;
(Continued)

(56) References Cited

U.S. PATENT DOCUMENTS

2015/0256456 A1* 9/2015 Previdi ................. H04L 69/166
370/392
2018/0191673 A1* 7/2018 Rajarathinam ......... H04L 67/56
(Continued)

FOREIGN PATENT DOCUMENTS

CN 102088391 A 6/2011
CN 109218158 A 1/2019
(Continued)

OTHER PUBLICATIONS

Smith, M., "VXLAN Group Policy Option", Internet Engineering Task Force, Oct. 22, 2018, 6 Pages (Year: 2018).*
(Continued)

*Primary Examiner* — Lan-Huong Truong
(74) *Attorney, Agent, or Firm* — Slater Matsil, LLP

(57) ABSTRACT

This application provides a packet processing method, a device, a system, and a storage medium. A first network device receives an original packet, generates an IPv6 packet based on the original packet and endpoint group (EPG) information, where the IPv6 packet comprises an IPv6 extension header and the original packet, and the IPv6 extension header comprises the EPG information, and sends the IPv6 packet. A second network device receives the IPv6 packet;

obtains the EPG information from the IPv6 extension header, and processes the IPv6 packet according to a group based policy corresponding to the EPG information.

20 Claims, 24 Drawing Sheets

(51) Int. Cl.
    *H04L 45/00* (2022.01)
    *H04L 45/74* (2022.01)
    *H04L 69/324* (2022.01)

(58) Field of Classification Search
    CPC ... H04L 45/50; H04L 63/0272; H04L 63/104;
              H04L 45/26; H04L 47/20; H04L 63/02
    See application file for complete search history.

(56) References Cited

U.S. PATENT DOCUMENTS

| 2021/0044445 A1* | 2/2021 | Bottorff | H04L 12/185 |
| 2023/0078123 A1* | 3/2023 | Zhang | H04L 45/74 |
| | | | 709/238 |
| 2023/0140531 A1* | 5/2023 | Peng | H04L 45/74 |
| | | | 709/238 |

FOREIGN PATENT DOCUMENTS

| CN | 109428888 A | 3/2019 |
| CN | 109728990 A | 5/2019 |
| CN | 110650075 B | 2/2022 |
| WO | 2020041150 A1 | 2/2020 |

OTHER PUBLICATIONS

CE Information, "CE Switch : Red Book Series: Micro-segmentation Topic", Mar. 1, 2013, 8 Pages.
Lemon, J., "Group Policy Encoding with VXLAN-GPE", Internet Engineering Task Force, Mar. 2, 2018, 5 Pages.
Lemon, J., "Geneve encapsulation for Group Based Policy", Internet Engineering Task Force, Mar. 11, 2019, 6 Pages.
Smith, M., "VXLAN Group Policy Option", Internet Engineering Task Force, Oct. 22, 2018, 6 Pages.

* cited by examiner

PACKET PROCESSING METHOD, DEVICE, SYSTEM, AND STORAGE MEDIUM

CROSS-REFERENCE TO RELATED APPLICATIONS

This application is a continuation of International Application No. PCT/CN2021/078660 filed on Mar. 2, 2021, which claims priority to Chinese Patent Application No. 202010245961.4, filed on Mar. 31, 2020. The disclosures of the aforementioned applications are hereby incorporated by reference in their entireties.

TECHNICAL FIELD

This application relates to the field of communication technologies, and in particular, to a packet processing method, a device, a system, and a storage medium.

BACKGROUND

Micro-segmentation is a refined group based network isolation technology. Through the micro-segmentation technology, devices on a network can be grouped according to a grouping rule with a finer granularity than a virtual local area network (VLAN), a group based policy is defined for each group, and the group based policy is executed to isolate traffic, so as to ensure service security.

In the micro-segmentation field, a group is referred to as an endpoint group (EPG). One EPG may include a plurality of members such as a server and a terminal, and a member included in the EPG is referred to as an endpoint. During micro-segmentation, when an original packet sent by a source endpoint device reaches a source virtual tunnel endpoint (VTEP) device, the source VTEP includes EPG information of the source endpoint device in a virtual extensible local area network (VXLAN) header, and encapsulates the original packet into the VXLAN header to obtain a VXLAN packet. The source VTEP sends the VXLAN packet to a destination VTEP. After receiving the VXLAN packet, the destination VTEP device decapsulates the VXLAN header to obtain the EPG information of the source endpoint device. The destination VTEP executes a group based policy based on the EPG information of the source endpoint device and EPG information of a destination end.

When the micro-segmentation technology is implemented by using the foregoing method, the VXLAN header is needed to carry EPG information. However, the VXLAN header is an overlay header, and encapsulation of the header is not simple enough. As a result, overheads of transmitting a packet in a network are excessively high.

SUMMARY

Embodiments of this application provide a packet processing method, a device, a system, and a storage medium, to reduce packet transmission overheads. The technical solutions are as follows:

According to a first aspect, a packet processing method is provided. The method is applied to an Internet Protocol version 6 IPv6 network and includes: A first network device in the IPv6 network receives an original packet; the first network device generates an IPv6 packet based on the original packet and endpoint group EPG information, where the IPv6 packet includes an IPv6 extension header and the original packet, and the IPv6 extension header includes the EPG information; and the first network device sends the IPv6 packet.

The foregoing provides a method for implementing micro-segmentation in the IPv6 network. The IPv6 extension header of the IPv6 packet carries the EPG information, so that the EPG information is visible to a receive end of the IPv6 packet, and the receive end of the IPv6 packet can execute a group based policy based on the EPG information in the IPv6 extension header without decapsulating a VXLAN header, thereby implementing a micro-segmentation function and reducing processing complexity. Since the IPv6 extension header is more extensible, the problem that the VXLAN header carrying the EPG information is less extensible is resolved, and new functions can be obtained through further extension. In addition, because a packet encapsulation format is simpler, and a header occupies fewer bytes, overheads caused by packet transmission are reduced.

Optionally, the EPG information includes first EPG information. The first EPG information identifies an EPG to which a first computing device belongs, and a source Internet Protocol IP address of the original packet includes an IP address of the first computing device.

The IPv6 extension header of the IPv6 packet carries EPG information of a source endpoint device, so that the EPG information of the source endpoint device can be forwarded along with the IPv6 packet in the IPv6 network. During forwarding of the IPv6 packet, a group based policy execution node can obtain the EPG information of the source endpoint device from the IPv6 extension header. This eliminates the workload of preconfiguring the EPG information of the source endpoint device on the group based policy execution node, simplifies the configuration of the group based policy execution node, and improves the efficiency of deploying micro-segmentation in the IPv6 network.

Optionally, the EPG information includes second EPG information. The second EPG information identifies an EPG to which a second computing device belongs, and a destination IP address of the original packet includes an IP address of the second computing device.

The IPv6 extension header is used to transmit EPG information of a destination endpoint device in the IPv6 network, so that during forwarding of the IPv6 packet, a group based policy execution node can obtain the EPG information of the destination endpoint device from the IPv6 extension header. This eliminates the workload of preconfiguring the EPG information of the destination endpoint device on the group based policy execution node, simplifies the configuration of the group based policy execution node, and improves the efficiency of deploying micro-segmentation in the IPv6 network.

Optionally, the EPG information includes first EPG information and second EPG information.

The IPv6 extension header is used to transmit the EPG information of the source endpoint device and the EPG information of the destination endpoint device in the IPv6 network, so that during forwarding of the IPv6 packet, a group based policy execution node can obtain the EPG information of the source endpoint device and the EPG information of the destination endpoint device from the IPv6 extension header. This eliminates the workload of preconfiguring the EPG information of the source endpoint device and the EPG information of the destination endpoint device on the group based policy execution node, simplifies the configuration of the group based policy execution node, and improves the efficiency of deploying micro-segmentation in the IPv6 network.

Optionally, the IPv6 packet includes a hop-by-hop options header, and the hop-by-hop options header includes the EPG information.

Optionally, the hop-by-hop options header includes the first EPG information.

Optionally, the hop-by-hop options header includes the second EPG information.

Optionally, the hop-by-hop options header includes the first EPG information and the second EPG information.

Because the hop-by-hop options header is an IPv6 extension header that can be parsed by a transit node, when the hop-by-hop options header carries the EPG information and the IPv6 packet passes through the transit node in a forwarding process, the transit node can obtain the EPG information of the source endpoint device and/or the EPG information of the destination endpoint device from the hop-by-hop options header. In other words, the EPG information of the source endpoint device and/or the EPG information of the destination endpoint device are visible to the transit node. Therefore, the transit node can execute the group based policy based on the EPG information of the source endpoint device and/or the EPG information of the destination endpoint device, so that a non-VTEP device such as the transit node can also serve as the group based policy execution node. In an aspect, a limitation problem that only a VTEP device can support micro-segmentation is resolved, and functions of the transit node are extended to support micro-segmentation, so that micro-segmentation can be applied to more scenarios. In another aspect, the transit node executes the group based policy, so that unnecessary forwarding can be avoided. For example, when a processing action in the group based policy is Discard, the transit node discards a packet, instead of occupying network resources to forward the packet to a destination VTEP. In still another aspect, compared with an overlay header such as the VXLAN header, the hop-by-hop options header has a simpler encapsulation format, and the hop-by-hop options header occupies fewer bytes. Therefore, packet transmission overheads can be reduced. In addition, since the hop-by-hop options header is more extensible, the hop-by-hop options header can be extended to obtain new options, to further support other features. In still another aspect, this manner can be widely applied to IPv6-capable network devices, and the transit node is not required to support SRv6-TE. Therefore, this manner is more universal. In still another aspect, because the workload of preconfiguring the EPG information of the source endpoint device and the EPG information of the destination endpoint device on the transit node is avoided, the configuration of the transit node is simplified.

Optionally, the IPv6 extension header includes a destination options header, and the destination options header includes the EPG information.

Optionally, the destination options header includes the first EPG information.

Optionally, the destination options header includes the second EPG information.

Optionally, the destination options header includes the first EPG information and the second EPG information.

Because the destination options header is an IPv6 extension header to be parsed by a destination node, when the destination options header carries the EPG information, the destination node can be specified to execute the group based policy. In an aspect, compared with an overlay header such as the VXLAN header, the destination options header has a simpler encapsulation format, and the destination options header occupies fewer bytes. Therefore, packet transmission overheads can be reduced. In addition, since the destination options header is more extensible, the destination options header can be extended to obtain new options, to further support other features. In still another aspect, this manner can be widely applied to IPv6-capable network devices, and the transit node is not required to support SRv6-TE. Therefore, this manner is more universal. In still another aspect, because the workload of preconfiguring the EPG information of the source endpoint device on the destination node is avoided, the configuration of the destination node is simplified.

Optionally, the IPv6 extension header includes a hop-by-hop options header and a destination options header, and the hop-by-hop options header and the destination options header include the EPG information.

In this manner, during forwarding of the IPv6 packet along a path, the transit node can obtain the EPG information of the source endpoint device and the EPG information of the destination endpoint device from the hop-by-hop options header. Therefore, the transit node can execute the group based policy based on the EPG information of the source endpoint device and the EPG information of the destination endpoint device. In addition, the destination VTEP can obtain the EPG information of the source endpoint device from the destination options header. Therefore, the destination VTEP can also execute the group based policy based on the EPG information of the source endpoint device. In this way, the transit node and the destination node can sequentially execute the group based policy for the same IPv6 packet. The group based policy executed by the transit node is the same as or different from the group based policy executed by the destination node.

Optionally, the IPv6 extension header includes a type length value TLV, and the EPG information is located in a value field of the TLV.

A new TLV is obtained by extending the IPv6 extension header to carry the EPG information, so that the network device can obtain the EPG information from the new TLV. Because the workload of configuring a correspondence between an IP address and EPG information is avoided, the configuration of the network device is simplified.

Optionally, the IPv6 extension header includes one or more options, and the EPG information includes first EPG information and second EPG information; and the first EPG information and the second EPG information are located in a same option of the IPv6 extension header, or the first EPG information and the second EPG information are respectively located in different options of the IPv6 extension header.

A new option is obtained by extending the IPv6 extension header to carry the EPG information, so that the network device can obtain the EPG information from the new option, and the configuration of the network device is simplified.

Optionally, the IPv6 packet includes an outer IPv6 header of the original packet, and a destination IP address of the IPv6 header includes a virtual private network segment identifier VPN SID.

In this optional manner, traffic of different tenants is differentiated based on different VPN SIDs by using an SRv6-BE technology, so that tenants are isolated.

Optionally, the IPv6 packet includes an identifier field, and the identifier field indicates whether the IPv6 packet has been processed according to a group based policy corresponding to the EPG information.

The IPv6 packet carries the identifier field. When the IPv6 packet passes through each node, if an upstream node has executed the group based policy, the upstream node may identify, by using the identifier field, that the group based policy has been executed, so that a downstream node does not need to re-execute the group based policy. In a scenario in which a same group based policy needs to be executed only once along a path, the requirements of this scenario can be met, and the processing overheads of a node following the group based policy execution node are reduced.

Optionally, the EPG information is not in an IPv6 routing header, and the IPv6 routing header includes a segment routing header SRH.

In this manner, a receiving device of the IPv6 packet can obtain the EPG information from the IPv6 packet without supporting a special routing function (such as SR). Therefore, the function requirements for the receiving device are lowered.

According to a second aspect, a packet processing method is provided. The method is applied to an Internet Protocol version 6 IPv6 network, and includes the following.

A second network device in the IPv6 network receives an IPv6 packet, where the IPv6 packet includes an IPv6 extension header and an original packet, and the IPv6 extension header includes endpoint group EPG information; the second network device obtains the EPG information from the IPv6 extension header; and the second network device processes the IPv6 packet according to a group based policy corresponding to the EPG information.

Optionally, the EPG information includes at least one of first EPG information and second EPG information, the first EPG information identifies an EPG to which a first computing device belongs, a source Internet Protocol IP address of the original packet includes an IP address of the first computing device, the second EPG information identifies an EPG to which a second computing device belongs, and a destination IP address of the original packet includes an IP address of the second computing device.

Optionally, the IPv6 extension header includes at least one of a hop-by-hop options header and a destination options header, and at least one of the hop-by-hop options header and the destination options header includes the EPG information.

Optionally, after the second network device obtains the EPG information from the IPv6 extension header, the method further includes: The second network device obtains the group based policy based on the EPG information.

Optionally, the IPv6 extension header includes a type length value TLV, and the EPG information is located in a value field of the TLV.

Optionally, the IPv6 extension header includes one or more options, and the EPG information includes first EPG information and second EPG information; and the first EPG information and the second EPG information are located in a same option of the IPv6 extension header, or the first EPG information and the second EPG information are respectively located in different options of the IPv6 extension header.

Optionally, the IPv6 packet includes an outer IPv6 header of the original packet, and a destination IP address of the IPv6 header includes a virtual private network segment identifier VPN SID.

Optionally, the IPv6 packet includes an identifier field, the identifier field indicates whether the IPv6 packet has been processed according to the group based policy corresponding to the EPG information, and before that the second network device processes the IPv6 packet according to a group based policy corresponding to the EPG information, the method further includes: The second network device determines, based on a value of the identifier field, that the IPv6 packet has not been processed according to the group based policy.

Optionally, that the second network device processes the IPv6 packet according to a group based policy corresponding to the EPG information includes: The second network device updates the value of the identifier field.

Optionally, the EPG information is not in an IPv6 routing header, and the IPv6 routing header includes a segment routing header SRH.

According to a third aspect, a first network device is provided. The first network device has a packet processing function described in any one of the first aspect or the optional manners of the first aspect. The first network device includes at least one module, and the at least one module is configured to implement the packet processing method provided in any one of the first aspect or the optional manners of the first aspect. For specific details of the first network device provided in the third aspect, refer to any one of the first aspect or the optional manners of the first aspect. Details are not described herein again.

According to a fourth aspect, a second network device is provided. The second network device has a packet processing function described in any one of the second aspect or the optional manners of the second aspect. The second network device includes at least one module, and the at least one module is configured to implement the packet processing method provided in any one of the second aspect or the optional manners of the second aspect. For specific details of the second network device provided in the fourth aspect, refer to any one of the second aspect or the optional manners of the second aspect. Details are not described herein again.

According to a fifth aspect, a first network device is provided. The first network device includes a processor and a communication interface. The processor is configured to execute instructions, to enable the first network device to perform the packet processing method provided in any one of the first aspect or the optional manners of the first aspect. The communication interface is configured to receive a packet and send a packet. For specific details of the first network device provided in the fifth aspect, refer to any one of the first aspect or the optional manners of the first aspect. Details are not described herein again.

According to a sixth aspect, a second network device is provided. The second network device includes a processor and a communication interface. The processor is configured to execute instructions, to enable the second network device to perform the packet processing method provided in any one of the second aspect or the optional manners of the second aspect. The communication interface is configured to receive a packet. For specific details of the second network device provided in the sixth aspect, refer to any one of the second aspect or the optional manners of the second aspect. Details are not described herein again.

According to a seventh aspect, a computer-readable storage medium is provided. The storage medium stores at least one instruction, and when the instruction is read by a processor, a first network device is enabled to perform the packet processing method provided in any one of the first aspect or the optional manners of the first aspect.

According to an eighth aspect, a computer-readable storage medium is provided. The storage medium stores at least one instruction, and when the instruction is read by a processor, a second network device is enabled to perform the packet processing method provided in any one of the second aspect or the optional manners of the second aspect.

According to a ninth aspect, a computer program product is provided. When the computer program product runs on a first network device, the first network device is enabled to perform the packet processing method provided in any one of the first aspect or the optional manners of the first aspect.

According to a tenth aspect, a computer program product is provided. When the computer program product runs on a second network device, the second network device is enabled to perform the packet processing method provided in any one of the second aspect or the optional manners of the second aspect.

According to an eleventh aspect, a chip is provided. When the chip runs on a first network device, the first network device is enabled to perform the packet processing method provided in any one of the first aspect or the optional manners of the first aspect.

According to a twelfth aspect, a chip is provided. When the chip runs on a second network device, the second network device is enabled to perform the packet processing method provided in any one of the second aspect or the optional manners of the second aspect.

According to a thirteenth aspect, a network system is provided. The network system includes a first network device and a second network device. The first network device is configured to perform the method according to any one of the first aspect or the optional manners of the first aspect, and the second network device is configured to perform the method according to any one of the second aspect or the optional manners of the second aspect.

According to a fourteenth aspect, a first network device is provided. The first network device includes a central processing unit, a network processor, and a physical interface. The physical interface is configured to receive an original packet. The central processing unit is configured to generate an IPv6 packet based on the original packet and endpoint group EPG information. The network processor is configured to trigger the physical interface to send the IPv6 packet.

Optionally, the first network device includes a main control board and an interface board, the central processing unit is disposed on the main control board, the network processor and the physical interface are disposed on the interface board, and the main control board is coupled to the interface board.

In a possible implementation, an inter-process communication (IPC) channel is established between the main control board and the interface board, and the main control board and the interface board communicate with each other through the IPC channel.

According to a fifteenth aspect, a second network device is provided. The second network device includes a central processing unit, a network processor, and a physical interface. The physical interface is configured to receive an IPv6 packet. The central processing unit is configured to: obtain EPG information from an IPv6 extension header; and process the IPv6 packet according to a group based policy corresponding to the EPG information.

Optionally, the first network device includes a main control board and an interface board, the central processing unit is disposed on the main control board, the network processor and the physical interface are disposed on the interface board, and the main control board is coupled to the interface board.

In a possible implementation, an inter-process communication (IPC) channel is established between the main control board and the interface board, and the main control board and the interface board communicate with each other through the IPC channel.

DETAILED DESCRIPTION OF ILLUSTRATIVE EMBODIMENTS

Figure 1:
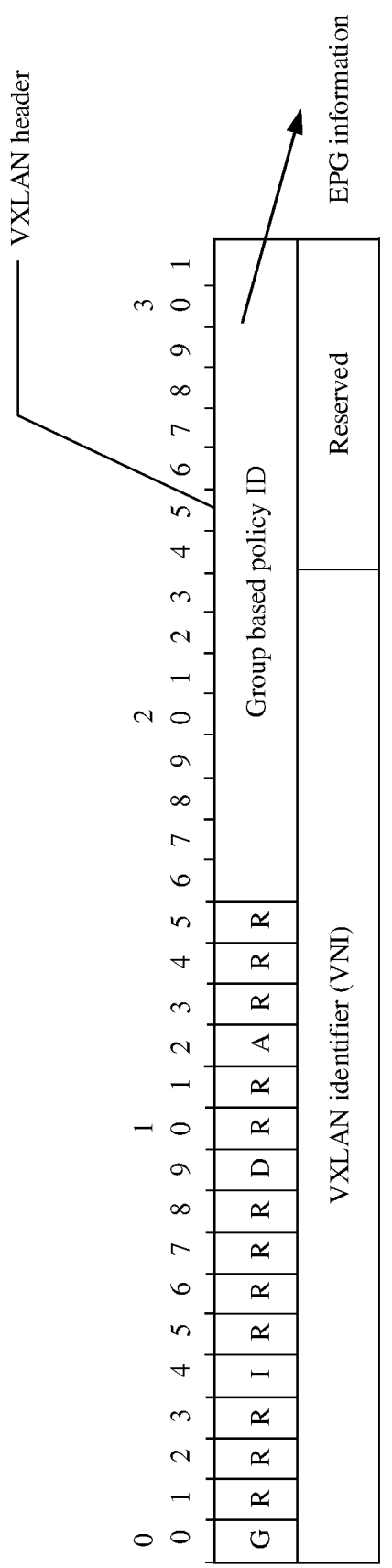
FIG. 1 is a schematic diagram of a format of a VXLAN header according to an embodiment of this application.

To make the objectives, technical solutions, and advantages of this application clearer, the following further describes the implementations of this application in detail with reference to the accompanying drawings.

In this application, the terms "first", "second", and the like are used to distinguish between same or similar items whose effects and functions are basically the same. It should be understood that there is no logical or time-sequence dependency between "first", "second", and "$n^{th}$", and a quantity and an execution sequence are not limited, either. It should be further understood that although the terms such as "first" and "second" are used in the following descriptions to describe various elements, these elements should not be limited by the terms. These terms are merely used to distinguish one element from another element. For example, without departing from the scope of various examples, first EPG information may be referred to as second EPG information, and similarly, second EPG information may be referred to as first EPG information. Both the first EPG information and the second EPG information may be EPG information, and in some cases, may be separate and different EPG information.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that", "in response to determining", "when (a stated condition or event) is detected", or "in response to detecting (a stated condition or event)".

A packet processing method provided in embodiments of this application can be applied to a scenario in which network border security needs to be ensured by using a micro-segmentation technology in a data center network, a campus network, and other networks, to help implement security management and control and simplify operation and maintenance. The following briefly describes the micro-segmentation technology.

A traditional network security model is a border security model. Main threats to a network come from the outside. Therefore, a firewall needs to be deployed at the border of the network. Traffic inside the network needs to be steered to the border firewall for security monitoring. As the scale of the network increases in data center and campus scenarios, the quantity of tenants in the network increases. Threats may come from users inside the network. As a result, the border security model is no longer applicable. Security analysis needs to be conducted on both north-south traffic and east-west traffic. Firewalls or isolation policies need to be deployed in a distributed manner. This security model is a zero-trust security model. The north-south traffic refers to traffic flowing into a data center or traffic flowing out from a data center. The east-west traffic refers to traffic inside a data center.

In view of this, currently, the micro-segmentation (Micro-segmentation) technology can be used to analyze the east-west traffic, to implement security isolation and protection.

Micro-segmentation can be literally split into two parts: "micro" and "segmentation". "Segmentation" means that devices on networks such as servers and terminals are grouped, and then group based policies are defined based on groups. The group based policies are executed on packets transmitted between different groups or between different members in a same group. Optionally, "micro" means that the grouping granularity is finer than the granularity of a subnet. Specifically, during subnet division, subnets can be generally divided only based on virtual local area network (VLAN) identifiers or VXLAN identifiers (Virtual Network IDs, VNIs). Devices belonging to different VLANs/VNIs are isolated from each other, and devices belonging to a same VLAN/VNI communicate with each other. However, the subnet-based granularity is too coarse to isolate different servers in a same subnet. In addition, when services change, subnets need to be re-divided. Micro-segments can be grouped based on an Internet Protocol (IP) address, an IP network segment, a media access control (MAC) address, a virtual machine (VM) name, a container, an operating system, and the like. Obviously, the granularity of grouping is much finer than the granularity of a subnet, and different devices belonging to a same VLAN can also be isolated from each other through micro-segmentation. Therefore, more fine-grained and more flexible traffic isolation is implemented, security management and control is implemented, operation and maintenance is simplified, and service security is ensured. Certainly, the granularity of micro-segmentation may not be finer than the granularity of a VLAN, and the description herein is merely used as an example for description.

The foregoing describes the micro-segmentation technology. The following describes terms and concepts in the micro-segmentation technology in embodiments of this application.

(1) EPG

An endpoint group (EPG) is also referred to as a micro-segment. The EPG is group of endpoint (Endpoint) devices grouped based on an (IP) address, an IP network segment, a media access control (MAC) address, a virtual machine (VM) name, a container, an operating system, or the like. One EPG contains a plurality of endpoint devices. Different endpoint devices in a same EPG have the same features (such as an IP network segment, a VM name prefix, and a container name prefix).

(2) Endpoint Device

The endpoint device may be implemented by using any type of device such as a computer that has a computing processing capability. Different endpoint devices in a same EPG may be referred to as intra-EPG members. Endpoint devices belonging to different EPGs may be referred to as inter-EPG members.

(3) EPG Information

The EPG information identifies an EPG to which an endpoint device belongs. The EPG information may include a plurality of data forms. Case 1 to case 3 are described below as examples.

Case 1: An EPG ID identifies an EPG to which an endpoint device belongs.

In case 1, the EPG information includes the EPG ID, and the EPG information is also referred to as a group ID or a group ID. For example, endpoint devices are VM 1 and VM 2. An EPG to which VM 1 belongs is EPG 1, and an EPG to which VM 2 belongs is EPG 2. In this example, EPG information of VM 1 includes "1", and EPG information of VM 2 includes "2".

Case 2: An IP address prefix identifies an EPG to which an endpoint device belongs.

In case 2, IP address prefixes of endpoint devices in a same EPG are the same, and the EPG information includes the IP address prefixes of the endpoint devices. For example, endpoint devices are grouped based on an IP network segment, VM 5 and VM 6 whose IP address prefixes are both A1::3:1/80 are grouped into a same EPG, and EPG information of both VM 5 and VM 6 includes A1::3:1/80.

Case 3: An interface name identifies an EPG to which an endpoint device belongs.

In case 3, the EPG information includes an interface name of an interface connecting a VTEP device and an endpoint device, and the interface includes but is not limited to a virtual interface or a physical interface. For example, VM 7 and VM 8 connected by a same virtual interface are grouped into a same EPG, the name of the virtual interface is vInf103-1, and EPG information of both VM 7 and VM 8 includes vInf103-1.

(4) Group Based Policy

A group based policy (GBP) is an EPG-based traffic control policy. The group based policy indicates a processing action performed on a packet transmitted between intra-EPG members or inter-EPG members. Access of the intra-EPG members and the inter-EPG members can be controlled according to the group based policy.

There are a plurality of types of processing actions corresponding to the group based policy. For example, the group based policy includes Permit (also referred to as Permit or Allow), Deny, Remark, Redirect, and Mirror. When the group based policy is Permit, the network device forwards a packet. In this way, intra-EPG members or inter-EPG members are allowed to communicate with each other. When the group based policy is Deny, the network device denies a packet. In this way, intra-EPG members or inter-EPG members are not allowed to communicate with each other. When the group based policy is Redirect, the network device redirects a packet to a firewall. Remarking is special forwarding. When the group based policy is Remark, the network device first remarks a packet and then forwards the remarked packet. Remarking includes but is not limited to remarking a differentiated services code point (DSCP) of the packet or modifying a priority of the packet. Since the plurality of types of group based policies are supported, the requirements of various network services can be met, and more application scenarios can be satisfied.

The group based policy is usually associated with a matching condition, and a correspondence between the group based policy and the matching condition is usually stored by using a policy matrix. For example, refer to Table 1 below. The policy matrix shown in Table 1 includes four group based policies. * indicates a wildcard.

TABLE 1

| Matching condition (rule) | | |
| --- | --- | --- |
| EPG information of a source endpoint device | EPG information of a destination endpoint device | Group based policy |
| EPG 1 | EPG 2 | Deny (Deny) |
| EPG 2 | EPG 1 | Allow (Allow) |
| EPG 3 | * | Allow (Allow) |
| EPG 4 | EPG 5 | Redirect (redirect) |
| * | EPG 6 | Allow (Allow) |

The matching condition is also referred to as a matching rule or a rule. When EPG information carried in a packet matches the matching condition, the network device executes a group based policy corresponding to the EPG information. There are many cases in which the EPG information in the matching condition is the EPG information of the source endpoint device and/or the EPG information of the destination endpoint device. Case 1 to case 3 are described below as examples.

Case 1: The matching condition includes the EPG information of the source endpoint device and the EPG information of the destination endpoint device.

For example, refer to the first matching condition shown in Table 1. The first matching condition includes EPG 1 and EPG 2. EPG 1 is described as an example of the EPG information of the source endpoint device. EPG 2 is described as an example of the EPG information of the destination endpoint device. If the EPG information of the source endpoint device and the EPG information of the destination endpoint device that are carried in a packet are EPG 1 and EPG 2 respectively, the packet matches the first matching condition. The network device discards the packet according to the group based policy of Deny.

Case 2: The matching condition includes the EPG information of the source endpoint device and does not include the EPG information of the destination endpoint device.

Refer to the third matching condition shown in Table 1. The third matching condition includes EPG 3 and *. EPG 3 is described as an example of the EPG information of the source endpoint device. The matching condition indicates that packets sent from EPG 3 to all other EPGs should be allowed. If the EPG information of the source endpoint device carried in a packet is EPG 3, the packet matches the third matching condition. The network device forwards the packet according to the group based policy of Allow. In this way, an EPG to which a destination endpoint of a packet belongs is not limited, and whether the packet carries EPG information of the destination endpoint is not limited.

Case 3: The matching condition includes the EPG information of the destination endpoint device and does not include the EPG information of the source endpoint device.

Refer to the fifth matching condition shown in Table 1. The fifth matching condition includes * and EPG 6. EPG 6 is described as an example of the EPG information of the destination endpoint device. The matching condition indicates that all packets sent to EPG 6 should be allowed. If the EPG information of the destination endpoint device carried in a packet is EPG 6, the packet matches the fifth matching condition. The network device forwards the packet according to the group based policy of Allow. In this way, an EPG to which a source endpoint of a packet belongs is not limited, and whether the packet carries EPG information of the source endpoint is not limited.

The group based policy may include a plurality of data forms. Allow, Deny, and the like shown in Table 1 are merely examples of data forms of the group based policy. In some embodiments, the group based policy may be represented in another data form. For example, the group based policy is represented by the number of a processing action. For example, a number, namely, 1, is allocated to a processing action such as Forward, and a number, namely, 2, is allocated to a processing action such as Discard. The group based policy may be in a data form such as 1 and 2. When the group based policy is 1, the group based policy, that is, forwarding a packet, is executed. When the group based policy is 2, the group based policy, that is, discarding a packet, is executed. For another example, the group based policy is represented by using an instruction corresponding to a processing action. For example, the group based policy is represented by using pseudocode. For example, the group based policy is remark dscp 40, and remark dscp 40 is an instruction corresponding to Remark. This instruction instructs to modify a DSCP of a packet to 40. The network device executes the group based policy, that is, remarking the packet.

This embodiment does not require that the matching condition include only the EPG information. Optionally, the matching condition includes information other than the EPG information. In other words, the network device determines, not only based on EPG information of a packet but also based on other information related to the packet, a group based policy to be executed. For example, the matching condition further includes a transmission direction of the packet. The transmission direction of the packet includes In and Out. When the matching condition includes In, the network device executes the group based policy on a received packet. When the matching condition includes Out, the network device executes the group based policy on a to-be-sent packet.

The foregoing describes the micro-segmentation technology and some terms in the micro-segmentation technology. The following describes forwarding scenarios of micro-segmentation.

In data center and campus scenarios, an endpoint device is connected to a VTEP device (such as an access switch). In other words, each VTEP device is connected to at least one endpoint device. During micro-segmentation deployment, group based policies and matching conditions are configured on VTEP devices, and EPG information of endpoint devices is also configured on the VTEP devices. Considering that there are usually a large quantity of endpoint devices in a network, EPG information of all endpoint devices in the network is usually not configured on each VTEP device. Instead, EPG information of an endpoint device is configured on a VTEP device connected to the endpoint device. In other words, EPG information of an endpoint device is configured on a VTEP device to which the endpoint device is connected, so that the VTEP device prestores EPG information of each connected endpoint device.

In this technical background, mutual access of different endpoint devices connected to a same VTEP device differs from mutual access of endpoint devices connected to different VTEP devices during implementation. Scenario 1 and scenario 2 are described below as examples.

Scenario 1: Different Endpoint Devices Connected to a Same VTEP Device Access Each Other.

Scenario 1 is also referred to as a local forwarding scenario. A source endpoint device and a destination endpoint device of an original packet are connected to a same VTEP device, and the VTEP device serves as a group based policy execution node. Specifically, in scenario 1, a forwarding path of the original packet includes source endpoint device→VTEP device→destination endpoint device. Because the VTEP device is connected to both the source endpoint device and the destination endpoint device, both the EPG information of the source endpoint device and the EPG information of the destination endpoint device are stored on the VTEP device, and the VTEP device can execute the group based policy based on the EPG information of the source endpoint device and the EPG information of the destination endpoint device.

Scenario 2: Endpoint Devices Connected to Different VTEP Devices Access Each Other.

Scenario 2 is also referred to as a cross-EPG forwarding scenario. The source endpoint device and the destination endpoint device of the original packet are respectively connected to different VTEP devices. Generally, a VTEP device connected to the destination endpoint device serves as a group based policy execution node.

For example, a VTEP device connected to the source endpoint device is referred to as a source VTEP device, and a VTEP device connected to the destination endpoint device is referred to as a destination VTEP device. In scenario 2, a forwarding path of the original packet includes source endpoint device→source VTEP device→one or more transit nodes→destination VTEP device→destination endpoint device. Because the EPG information of the source endpoint device is stored on the source VTEP device, but is not stored on the destination VTEP device, the source VTEP device needs to transmit the EPG information of the source endpoint device to the destination VTEP device in a manner, so that the destination VTEP device executes the group based policy based on the EPG information of the source endpoint device.

The foregoing describes two forwarding scenarios of micro-segmentation. Some embodiments of this application focus on describing how to implement micro-segmentation in scenario 2. For ease of understanding, the following describes specific application of micro-segmentation in scenario 2.

In a possible implementation, a VXLAN header in a virtual extensible local area network (VXLAN) packet carries the EPG information. For example, FIG. 1 shows a VXLAN header carrying a group based policy ID (where the group based policy ID corresponds to the EPG information). Specifically, there are a plurality of reserved fields in an original VXLAN encapsulation. In this method, the third byte and fourth byte in the VXLAN packet are used to carry a group based policy ID, and the first bit is set to a G flag. When the G flag is set to 1, it indicates that the group based policy ID exists. When traffic from the source endpoint device reaches the source VTEP device, if the source VTEP device determines, based on a routing table, that the destination endpoint device is not directly connected to the source VTEP device, the source VTEP device performs VXLAN encapsulation on a packet, and sends the VXLAN packet to the destination VTEP device to which the destination endpoint device is connected. When performing overlay (Overlay, also referred to as overlay) encapsulation, the source VTEP device needs to encapsulate the EPG information of the source endpoint device into the group based policy ID based on a local configuration, and set the G flag to 1. When the VXLAN packet reaches the destination VTEP device, the destination VTEP device decapsulates the VXLAN packet, caches the EPG information of the source endpoint device in the group based policy ID, and determines, based on a destination address of an inner packet, an EPG to which the destination endpoint device belongs. The destination VTEP device determines a to-be-executed group based policy based on the EPG to which the source endpoint device belongs and the EPG to which the destination endpoint device belongs.

However, when the foregoing manner is used, two defects are faced.

First, two roles of a policy execution node and a VTEP device are coupled. Specifically, the EPG information of the source endpoint device is carried in an overlay header (Overlay header) and transferred to the destination VTEP device. Because a transit node does not decapsulate the overlay header, the EPG information of the source endpoint device is invisible to the transit node. In this case, it is difficult for the transit node to execute the group based policy based on the EPG information of the source endpoint device.

Second, extensibility is poor. The length of a VXLAN header is fixed, and the quantity of reserved fields is limited. If the VXLAN header carries the EPG information, other features cannot be obtained based on the overlay header through further extension.

Figure 2:
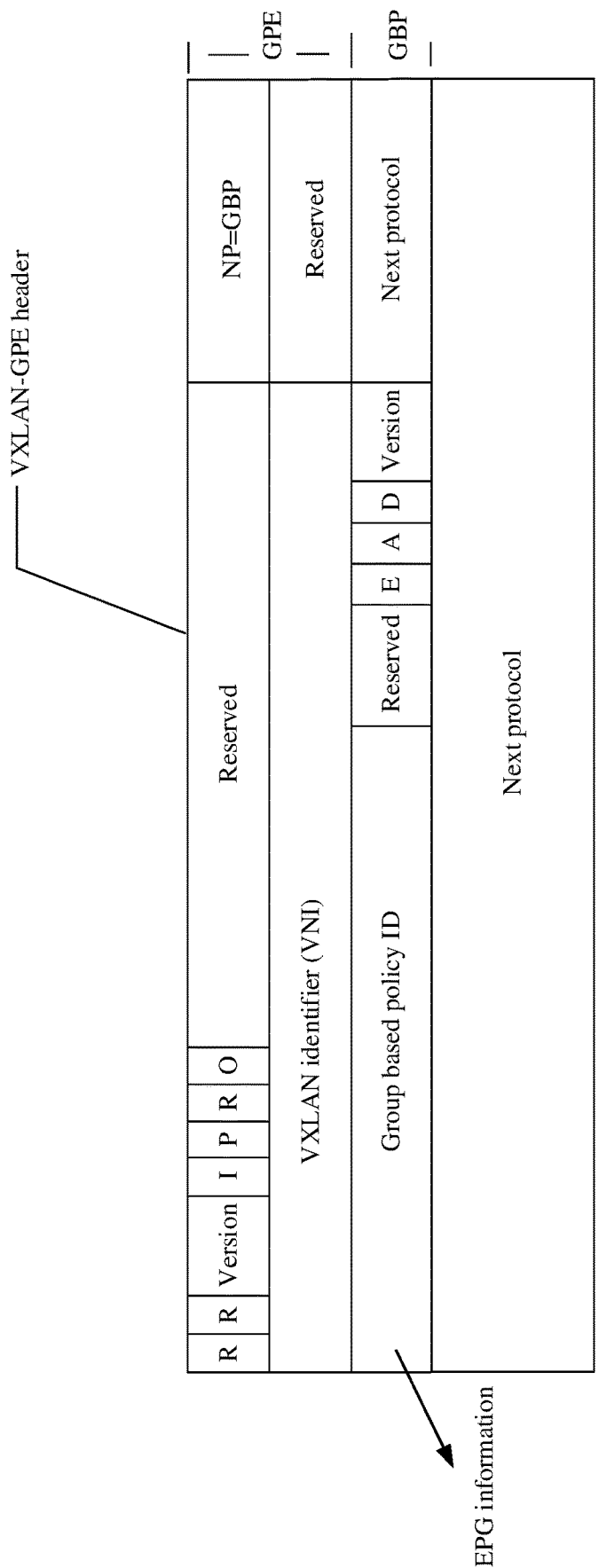
FIG. 2 is a schematic diagram of a format of a VXLAN-GPE header according to an embodiment of this application.
Figure 3:
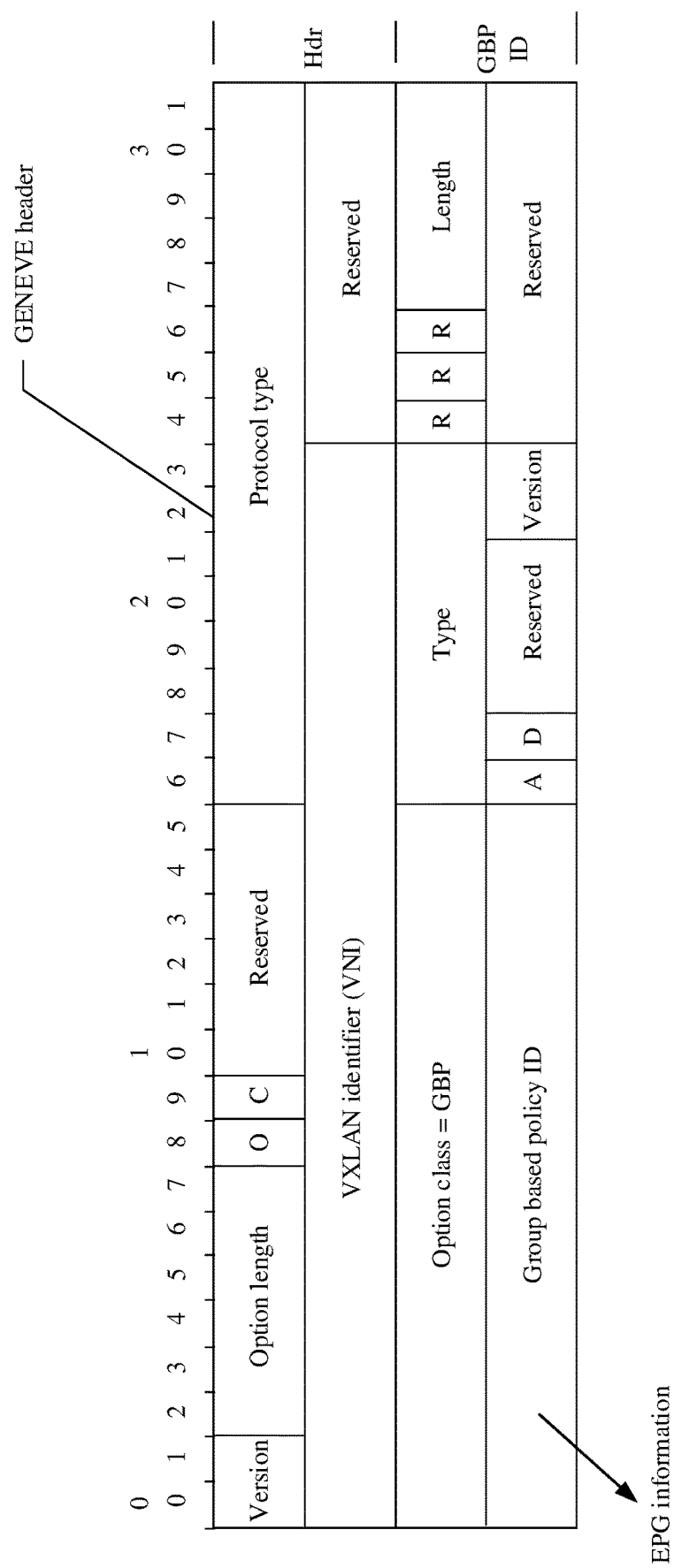
FIG. 3 is a schematic diagram of a format of a GENEVE header according to an embodiment of this application.

In another possible implementation, an extension header of an overlay header based on VXLAN generic protocol encapsulation (VXLAN-GPE) and general network virtualization encapsulation (GENEVE) carries the EPG information. For example, FIG. 2 shows a VXLAN-GPE header and an extension header that carries the EPG information, and FIG. 3 shows a GENEVE header and an extension header that carries the EPG information. A length field in FIG. 3 is a length field. A version number field is a version field. An option length field is an Opt Len field.

Specifically, extension headers are defined in VXLAN-GPE and GENEVE, and may be used to carry the EPG information. In this case, a next protocol (corresponding to VXLAN-GPE) field or a protocol type (corresponding to GENEVE) field in a VXLAN-GPE basic header or a GENEVE basic header needs to be set to a corresponding value for indexing the EPG information.

When traffic from the source endpoint device reaches the source VTEP device, if the source VTEP device determines, based on a routing table, that the destination endpoint device is not directly connected to the source VTEP device and the source VTEP device does not have the EPG information of the destination endpoint device locally, the source VTEP device needs to perform overlay encapsulation (VXLAN-GPE or GENEVE encapsulation) on the packet and send the packet to the destination VTEP device to which the destination endpoint device is connected. When performing overlay encapsulation, the source VTEP device needs to encapsulate the EPG information of the source endpoint device into the group based policy ID in the extension header based on a local configuration, and set the Next Protocol/Protocol Type field in the basic header. When the VXLAN packet reaches the destination VTEP device, the destination VTEP device decapsulates the overlay encapsulation, caches the EPG information of the source endpoint device in the group based policy ID in the extension header, and determines, based on a destination address of an inner packet, an EPG to which the destination endpoint device belongs. The destination VTEP device determines a to-be-executed group based policy based on the EPG to which the source endpoint device belongs and the EPG to which the destination endpoint device belongs.

In addition, the header may carry both the EPG information of the source endpoint device and the EPG information of the destination endpoint device. In VXLAN-GPE, two group based policy extension headers are used, and one bit is used to distinguish the EPG information of the source endpoint device from the EPG information of the destination endpoint device. In GENEVE, two type length values (TLV) are used, and different types are used to distinguish the EPG information of the source endpoint device from the EPG information of the destination endpoint device. In this case, the group based policy can be executed at a centralized gateway/firewall. An overlay tunnel needs to be divided into two segments. The first segment is from the source VTEP device to the centralized gateway/firewall, and the second segment is from the centralized gateway/firewall to the destination VTEP device. The gateway also serves as a VTEP device. In this technology, the source VTEP device is responsible for searching for and encapsulates the EPG information of the source endpoint device and the EPG information of the destination endpoint device in an inner packet, and the centralized gateway/firewall is responsible for executing the group based policies based on the EPG information.

However, when the foregoing manner is used, two defects are faced.

First, two roles of a policy execution node and a VTEP device are coupled. The EPG information of the source endpoint device and the EPG information of the destination endpoint device are carried in an overlay header and then transferred to the destination VTEP. The EPG information of the source endpoint device is visible to the transit node only after being decapsulated. Processing performed by the transit node is complex because the VXLAN header needs to be decapsulated.

Second, encapsulation is not simple enough, and since an extended header is added, the header overheads are larger.

In view of this, in some embodiments of this application, for a scenario in which endpoint devices connected to different VTEP devices access each other, a method for carrying EPG information by using IPv6 is provided. An overlay header such as a VXLAN header, a VXLAN-GPE header, or a GENEVE header is no longer used while a micro-segmentation function is implemented, so that packet encapsulation is simpler. In some embodiments, the EPG information of the source endpoint device and the EPG information of the destination endpoint device are visible to the transit node, so that the group based policy can be executed on the transit node. Therefore, the roles of the policy execution node and the destination VTEP device are decoupled, and deployment of the group based policy is more flexible.

The following describes the technical solutions provided in embodiments of this application from a plurality of perspectives such as a system architecture, a method, a virtual apparatus, an entity apparatus, and a medium.

The following describes a system architecture provided in embodiments of this application.

Figure 4:
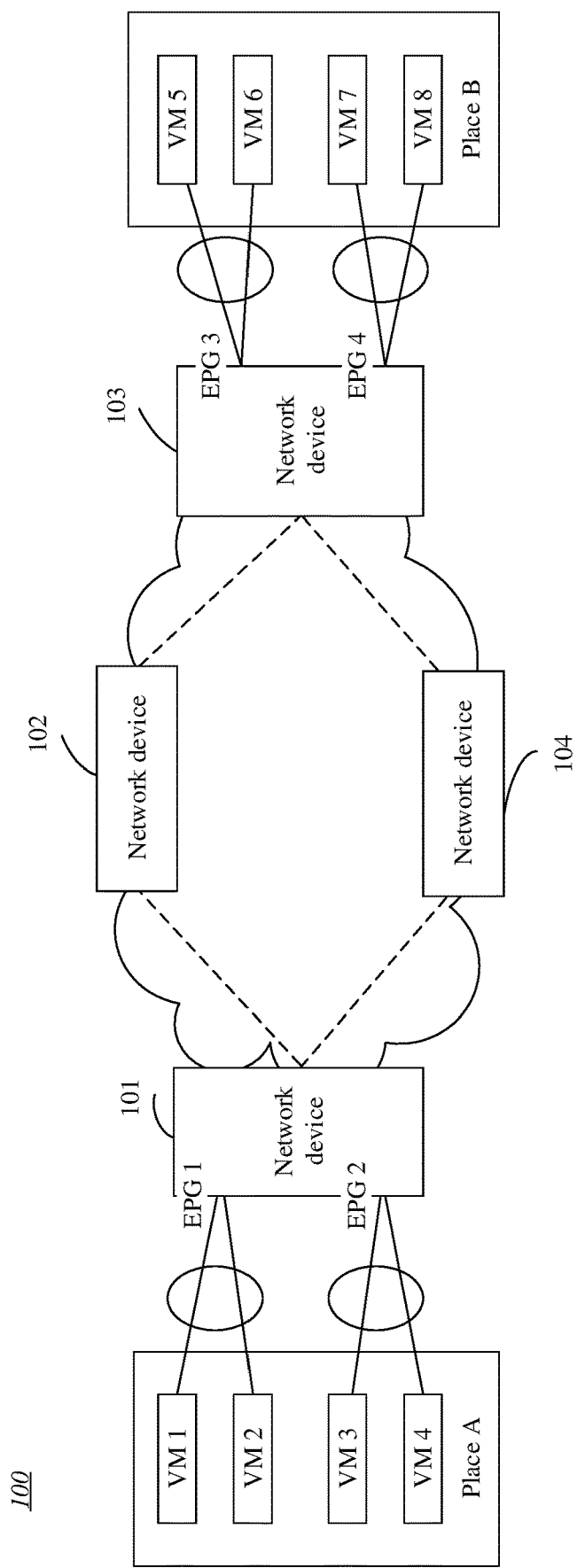
FIG. 4 is a schematic diagram of a system architecture 100 according to an embodiment of this application.

Refer to FIG. 4. An embodiment of this application provides a system architecture 100. The system architecture 100 is described as an example of a networking topology in which micro-segmentation is implemented based on IPv6. The system architecture 100 includes a plurality of network devices and a plurality of computing devices.

The network device corresponds to a VTEP device or a transit node between different VTEP devices. The network device is, for example, a network device 101, a network device 102, a network device 103, or a network device 104. Optionally, the network device 101 and the network device 103 are configured as VTEP devices. The network device 102 and the network device 103 are configured as transit nodes on a forwarding path of a packet.

The computing devices correspond to endpoint devices in a micro-segmentation technology. The computing devices include but are not limited to hosts, servers, personal computers, or the like. The computing devices may be physical devices, or may be virtualized devices such as VMs or containers. For example, refer to FIG. 4. The computing device is VM 1, VM 2, VM 3, VM 4, VM 5, VM 6, VM 7, or VM 8.

The network devices of the system architecture 100 support IPv6. The computing devices of the system architecture 100 may or may not support IPv6. Specifically, the network device 101, the network device 102, the network device 103, or the network device 104 belongs to a same IPv6 network, and the network device 101, the network device 102, the network device 103, or the network device 104 supports an IPv6 routing and forwarding function. VM 1, VM 2, VM 3, VM 4, VM 5, VM 6, VM 7, or VM 8 may support IPv6, or may support IPv4 rather than IPv6.

The network device 101 is connected to VM 1, VM 2, VM 3, and VM 4, and the network device 101 stores EPG information of the four VMs: VM 1, VM 2, VM 3, and VM 4. VM 1 and VM 2 belong to a same EPG: EPG 1. The EPG information of VM 1 identifies EPG 1, and the EPG information of VM 2 identifies EPG 1. VM 3 and VM 4 belong to a same EPG: EPG 2. The EPG information of VM 3 identifies EPG 2, and the EPG information of VM 4 identifies EPG 2. In addition, the network device 101 is further connected to the network device 102 and the network device 104; the network device 102 is connected to the network device 101 and the network device 103; the network device 104 is connected to the network device 101 and the network device 103; the network device 103 is connected to VM 5, VM 6, VM 7, and VM 8. The network device 103 stores EPG information of the four VMs: VM 5, VM 6, VM 7, and VM 8. VM 5 and VM 6 belong to a same EPG: EPG 3. The EPG information of VM 1 identifies EPG 3, and the EPG information of VM 2 identifies EPG 3. VM 7 and VM 8 belong to a same EPG: EPG 4. The EPG information of VM 3 identifies EPG 4, and the EPG information of VM 4 identifies EPG 4. In addition, the network device 101 is further connected to the network device 102 and the network device 104. In addition, the network device 103 is further connected to the network device 102 and the network device 104.

Figure 5:
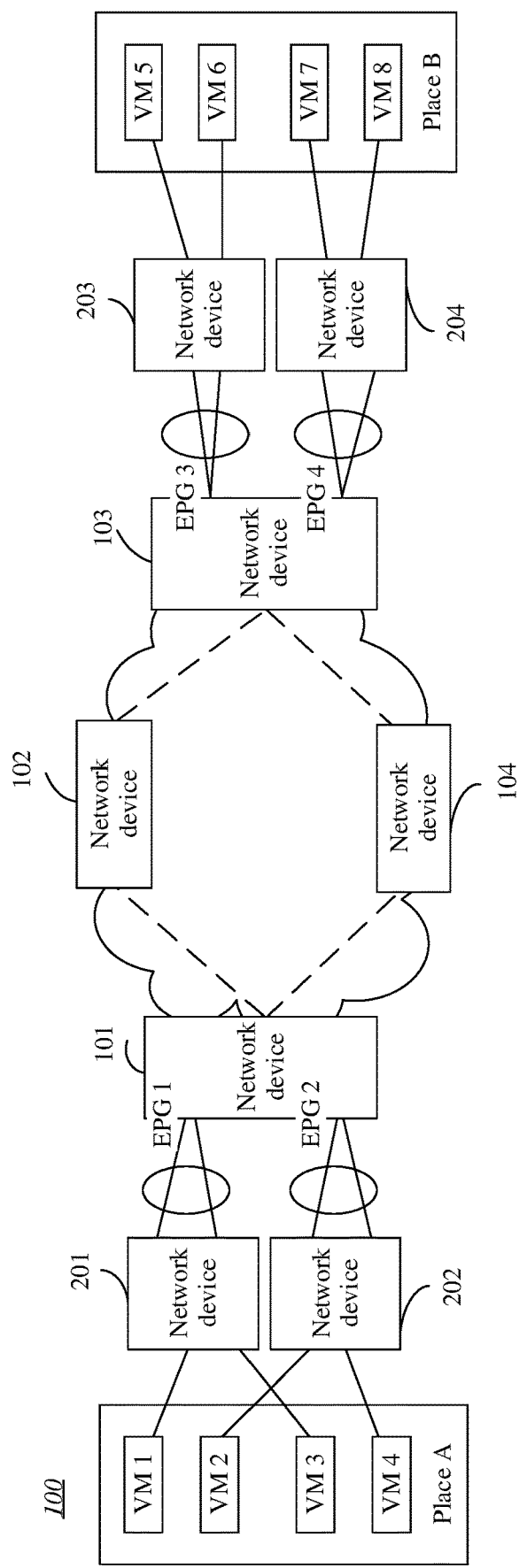
FIG. 5 is a schematic diagram of a system architecture 100 according to an embodiment of this application.

In the system architecture 100, a specific connection manner of the network device 101, the network device 103, and corresponding VMs thereof is not limited. The network device 101 and the network device 103 may be directly connected to the corresponding VMs, or may be connected to the corresponding VMs by using another network device such as a switch or a firewall. As shown in FIG. 5, the network device 101 is connected to VM 1 and VM 3 by using the network device 201, and the network device 101 is connected to VM 2 and VM 4 by using the network device 202. The network device 103 is connected to VM 5 and VM 6 by using the network device 203, and the network device 103 is connected to VM 7 and VM 8 by using the network device 204. A manner of dividing corresponding micro-segments for endpoint groups by the network device 101 and the network device 103 is not limited to a specific connection manner. To be specific, micro-segments may be divided not only based on a physical or virtual interface of the endpoint groups, but also based on a feature of a final endpoint group, for example, an IP address, a DSCP, a combination of the IP address and the DSCP, or more features.

A person skilled in the art may know that there may be more or fewer network devices in the system architecture 100. For example, there may be dozens of, hundreds of, or more network devices. The quantity of network devices and the type of a device are not limited in embodiments of this application.

The foregoing describes the system architecture 100. The following describes, by using method 200, method 300, and method 400 as examples, a method procedure for implementing micro-segmentation based on the system architecture provided above.

Figure 6:
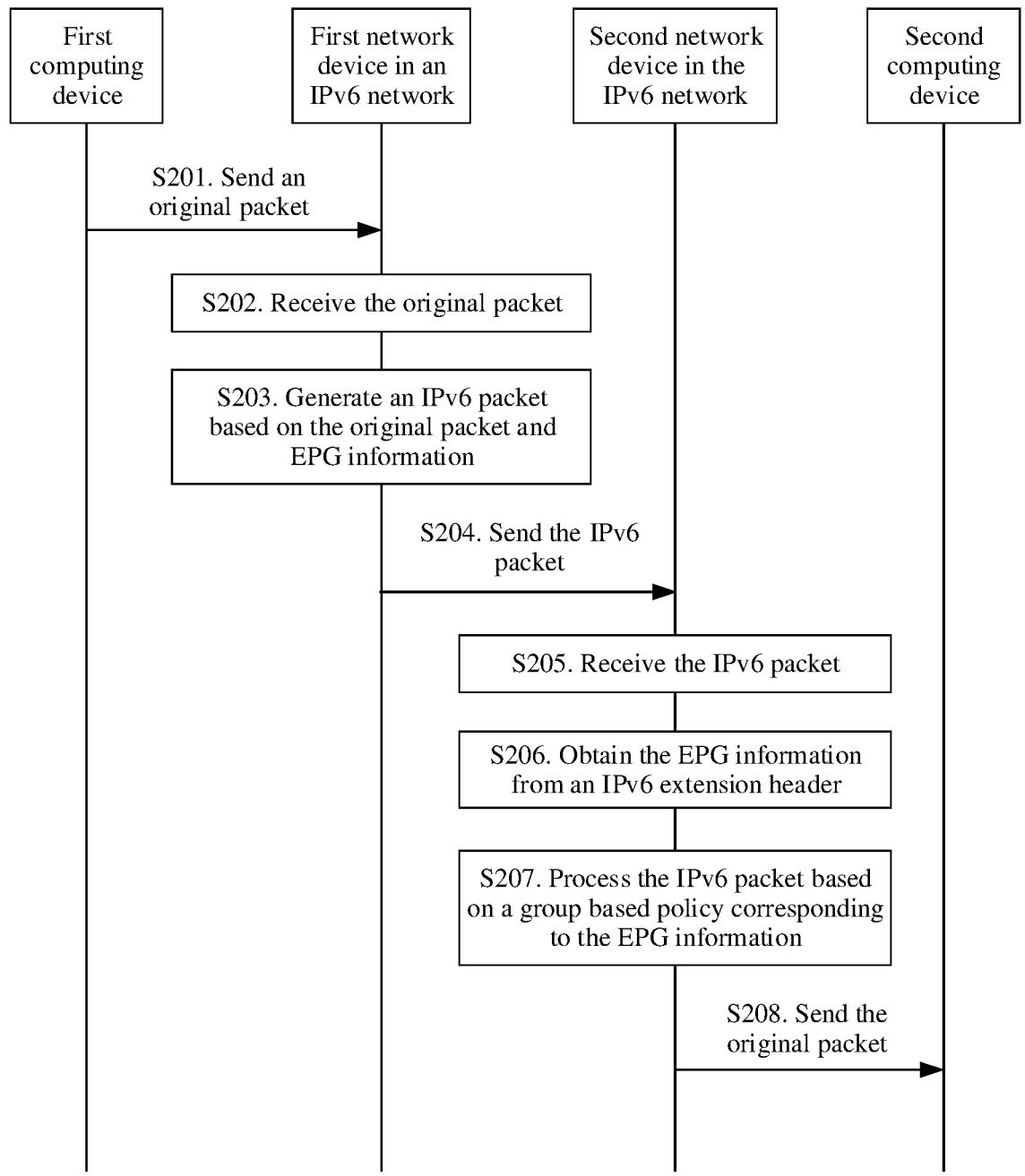
FIG. 6 is a flowchart of a packet processing method 200 according to an embodiment of this application.

FIG. 6 is a flowchart of a packet processing method 200 according to an embodiment of this application.

In the method 200, a scenario in which a first computing device accesses a second computing device is used as an example to describe how inter-EPG members across VTEP devices implement micro-segmentation based on IPv6. In the method 200, a forwarding path of an original packet includes first computing device→first network device→second network device→second computing device.

Optionally, the first computing device and the second computing device correspond to endpoint devices in a micro-segmentation technology. The first computing device corresponds to a source endpoint device. The second computing device corresponds to a destination endpoint device. The first computing device and the second computing device are not connected to a same VTEP device. In other words, a VTEP device connected to the first computing device is different from a VTEP device connected to the second computing device. The first computing device and the second computing device belong to different EPGs, and the first computing device and the second computing device correspond to inter-group members of EPGs in the micro-segmentation technology.

Optionally, the first network device is a VTEP device connected to the first computing device, and the first network device corresponds to a source VTEP device. The source VTEP device is also referred to as an ingress VTEP device or an ingress VTEP, and the source VTEP device is a VTEP device connected to the source endpoint device.

The second network device is a downstream node of the first network device on the forwarding path of the original packet. Optionally, the second network device is a VTEP device connected to the second computing device, and the second network device may correspond to a destination VTEP device. Alternatively, the second network device is a transit node. The destination VTEP device is referred to as an egress VTEP device or an egress VTEP. The destination VTEP device is a VTEP device connected to the destination endpoint device. The transit node is a forwarding node between the source VTEP device and the destination VTEP device on the forwarding path of the original packet. The transit node is referred to as a non-VTEP device. For example, refer to FIG. 4. In a scenario in which VM 1 accesses VM 5, the destination VTEP device is a network device 103, and the transit node is a network device 102 or a network device 104.

Optionally, the method 200 is performed by a network device and a computing device in the system architecture 100. For example, the first computing device in the method 200 is VM 1, VM 2, VM 3, or VM 4. In the method 200, the first network device is the network device 101. In the method 200, the second network device is the network device 102, the network device 103, or the network device 104. In the method 200, the second computing device is VM 5, VM 6, VM 7, or VM 8.

Optionally, the method 200 is processed by a general-purpose central processing unit (CPU), may be co-processed by a CPU and a network processor (NP), or may be processed by another processor suitable for packet forwarding instead of being processed by a CPU or an NP. This is not limited in this application. For example, the CPU is configured to undertake processing work corresponding to S203, S206, and S207, and the NP is configured to undertake processing work corresponding to S201, S202, S204, S205, and S208.

For example, the method 200 includes S201 to S208.

S201. The first computing device sends an original packet.

The original packet is explained in this paragraph. The original packet includes but is not limited to an IPv4 packet, an IPv6 packet, or an Ethernet frame. Optionally, the original packet is a data packet. A source IP address of the original packet includes an IP address of the first computing device. A destination IP address of the original packet includes an IP address of the second computing device. For example, refer to FIG. 4. An example in which VM 1 accesses VM 5 is used. The first computing device is VM 1, and the second computing device is VM 5. When VM 1 sends the original packet to VM 5, the source IP address of the original packet includes an IP address of VM 1, and the destination IP address of the original packet includes an IP address of VM 5.

S202. The first network device receives the original packet.

There are a plurality of implementations for the first network device to receive the original packet. In a possible implementation, the first network device and the first computing device are located in a same entity device, and the first network device communicates with the first computing device through a connection inside the device, so as to receive the original packet sent by the first computing device. For example, the first network device and the first computing device are located in a same server, the first computing device is a VM running in the server, and the first network device is a network adapter or a hypervisor (Hypervisor, also referred to as a virtual machine monitor, VMM) in the server. After the VM sends the original packet, the network adapter or the hypervisor receives the original packet sent by the VM. In another possible implementation, the first network device and the first computing device are located in different entity devices, and the first network device communicates with the first computing device over a network, so as to receive the original packet sent by the first computing device. For example, the first computing device is a VM running in a server, and the first network device is a data center switch connected to the server over a network. After the VM sends the original packet, the data center switch receives the original packet sent by the VM.

S203. The first network device generates an IPv6 packet based on the original packet and EPG information.

The first network device obtains the EPG information based on the original packet. The first network device includes the original packet and the EPG information together in the IPv6 packet, to obtain the IPv6 packet including the original packet and the EPG information. There are many cases of the EPG information included by the first network device in the IPv6 packet. Case 1 to case 3 are described below as examples.

Case 1: The first network device includes EPG information of the source endpoint device in the IPv6 packet.

This embodiment describes a scenario in which the first computing device accesses the second computing device as an example. The EPG information includes at least one of EPG information of the first computing device or EPG information of the second computing device. To distinguish the EPG information of the first computing device from the EPG information of the second computing device, the EPG information of the first computing device is referred to as first EPG information, and the EPG information of the second computing device is referred to as second EPG information. The first EPG information is described as an example of the EPG information of the source endpoint device, and the second EPG information is described as an example of the EPG information of the destination endpoint device.

The first EPG information identifies an EPG to which the first computing device belongs. For example, refer to FIG. 4. VM 1 sends the original packet to VM 5, and the original packet is transmitted from VM 1 to the network device 101 (the first network device). In this example, the first computing device (the source endpoint device) is VM 1, the EPG to which VM 1 belongs is EPG 1, and the first EPG information identifies EPG 1. For example, the first EPG information is an ID of EPG 1, an IP address prefix of VM 1, an IP address of VM 1, or a name of an interface through which VM 1 is connected to the network device 101.

Case 2: The first network device includes the EPG information of the destination endpoint device in the IPv6 packet.

The second EPG information identifies an EPG to which the second computing device belongs. For example, refer to FIG. 4. VM 1 sends the original packet to VM 5, and the original packet is transmitted from VM 1 to the network device 101 (the first network device). In this example, the second computing device (the destination endpoint device) is VM 5, an EPG to which VM 5 belongs is EPG 3, and the second EPG information (the EPG information of the destination endpoint device) identifies EPG 3. For example, the second EPG information is an ID of EPG 3, an IP address prefix of VM 5, an IP address of VM 5, or a name of an interface through which VM 5 is connected to the network device 103.

Case 3: The first network device includes the EPG information of the source endpoint device and the EPG information of the destination endpoint device in the IPv6 packet.

Specifically, the EPG information included by the first network device in the IPv6 packet includes the first EPG information and the second EPG information, so that the EPG information of both the first computing device and the second computing device is carried in the IPv6 packet.

There are a plurality of implementations for the first network device to obtain the EPG information based on the original packet. Manner A and manner B are described below as examples.

Manner A: The first network device determines the EPG information based on an IP address included in the original packet.

Specifically, the first network device locally prestores a correspondence between an IP address and EPG information, and the first network device queries the correspondence between the IP address and the EPG information based on an IP address included in the original packet, to obtain the EPG information corresponding to the IP address. For example, the first network device queries the correspondence between the IP address and the EPG information based on the source IP address of the original packet, to obtain the first EPG information corresponding to the source IP address. For another example, the first network device queries the correspondence between the IP address and the EPG information based on the destination IP address included in the original packet, to obtain the second EPG information corresponding to the destination IP address.

The correspondence between the IP address and the EPG information may be referred to as a local matching policy. For example, the correspondence between the IP address and the EPG information is as shown in Table 2 below. For example, the first network device receives the original packet, where the source IP address of the original packet is 192.168.10.1/32, and the destination IP address of the original packet is 192.168.20.2/32. The first network device queries Table 2 below, determines that the first EPG information is EPG 1, and determines that the second EPG information is EPG 2.

TABLE 2

| IP address | EPG information |
| --- | --- |
| 192.168.10.1/32 | EPG 1 |
| 192.168.20.2/32 | EPG 2 |

Manner B: The first network device determines the EPG information based on an interface through which the original packet is received. For example, the first network device stores a correspondence between an interface name and EPG information. After receiving the original packet through an interface, the first network device queries the correspondence between the interface name and the EPG information based on an interface name of the interface, to obtain the EPG information.

Manner A and manner B above are merely examples for determining the EPG information. In some other embodiments, the first network device identifies, based on the original packet, an IP network segment, a MAC address, a VM name, a container, or an operating system to which the first computing device belongs, and determines the EPG information based on an identification result.

Figure 7:
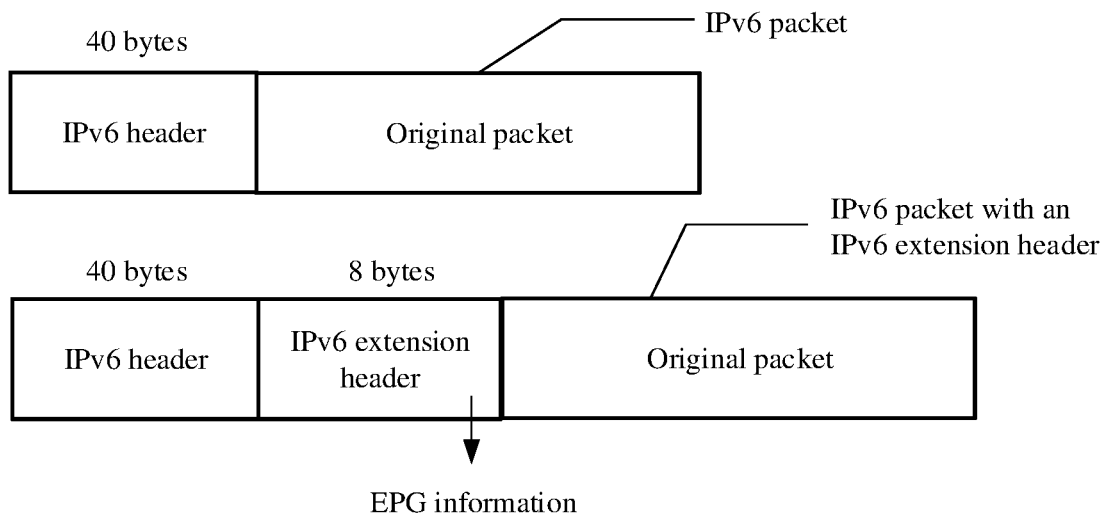
FIG. 7 is a schematic diagram of a format of an IPv6 packet according to an embodiment of this application.

The IPv6 packet generated by the first network device includes an IPv6 header, an IPv6 extension header, and the original packet. The IPv6 header and the IPv6 extension header are two types of IPv6 headers. For example, FIG. 7 shows IPv6 packets of two structures. One type of IPv6 packet includes an IPv6 header but does not include an IPv6 extension header, and the other type of IPv6 packet includes an IPv6 header and an IPv6 extension header. The following describes the IPv6 header and the IPv6 extension header.

Figure 8:
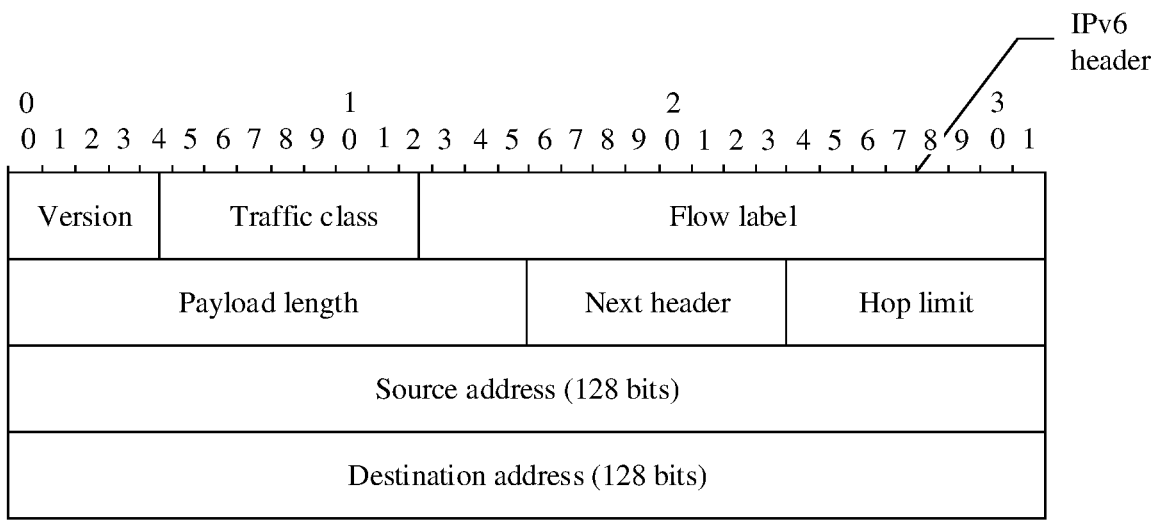
FIG. 8 is a schematic diagram of a format of an IPv6 header according to an embodiment of this application.

The IPv6 header is also referred to as an IPv6 basic header or an IPv6 standard header. The IPv6 header is usually the first header of the IPv6 packet, that is, the outermost header. For the structure of the IPv6 header, refer to FIG. 8. The IPv6 header includes a version field, a traffic class field, a flow label field, a payload length field, a next header field, a source address field, and a destination address field. The source address field carries a 128-bit source IPv6 address. The destination address field carries a 128-bit destination IPv6 address.

There are a plurality of types of IPv6 extension headers. For example, the IPv6 extension header includes a hop-by-hop options header, a destination options header, and an SRH. The following separately describes the several types of IPv6 extension headers.

(1) Hop-by-Hop Options Header

Figure 9:
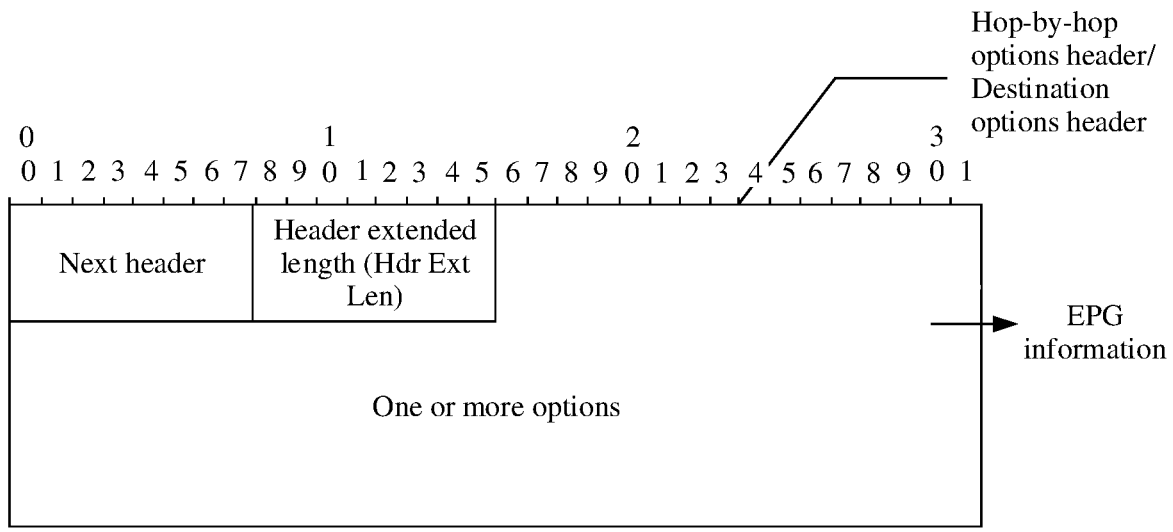
FIG. 9 is a schematic diagram of a format of a hop-by-hop options header or a destination options header according to an embodiment of this application.

The hop-by-hop options header (HBH) is an IPv6 extension header. The hop-by-hop options header may be processed by each transit node along a path in a forwarding process. If an IPv6 packet carries a hop-by-hop options header, a value of a next header field in the previous header of the hop-by-hop options header is 0. Optionally, the hop-by-hop options header is the first IPv6 extension header following the IPv6 header. In other words, the previous header of the hop-by-hop options header is the IPv6 header, and a value of a next header field of the IPv6 header is 0. FIG. 9 is a schematic structural diagram of a hop-by-hop options header. The hop-by-hop options header includes a next header field, a header extended length (Hdr Ext Len for short) field, and at least one option. The value of the next header field in the hop-by-hop options header indicates the type of the first header following the hop-by-hop options header. The value of the Hdr Ext Len field in the hop-by-hop options header indicates the length of the hop-by-hop options header. Options in the hop-by-hop options header are also referred to as hop-by-hop options. The hop-by-hop options are usually encoded in the form of TLVs. The hop-by-hop option includes an option type field, an option data length field, and a value field.

(2) Destination Options Header

The destination options header (DOH) is an IPv6 extension header. The destination options header is processed by a destination node on the forwarding path of the IPv6 packet, and the destination node is, for example, a device corresponding to a destination IPv6 address of the IPv6 header. If an IPv6 packet carries a destination options header, the value of a next header field in the previous header of the destination options header is 60. Refer to FIG. 9. Formats of the destination options header and the hop-by-hop options header are similar, and the destination options header includes a next header field, an Hdr Ext Len field, and at least one option. The value of the next header field indicates the type of the first header following the destination options header. The value of the Hdr Ext Len field indicates the length of the destination options header. Options in the destination options header are also referred to as destination options. The destination options are usually encoded in the form of TLVs. The destination option includes an option type field, an option data length field, and a value field.

(3) SRH

Figure 10:
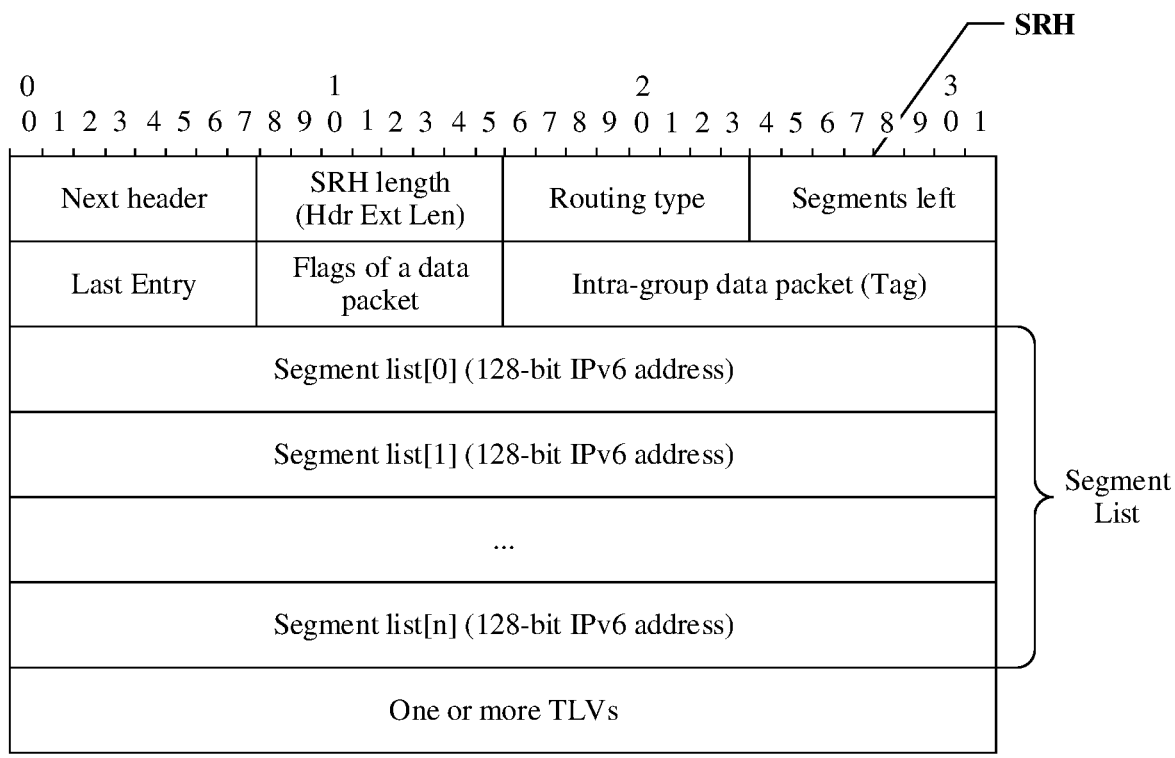
FIG. 10 is a schematic diagram of a format of an SRH according to an embodiment of this application.

The SRH is an IPv6 extension header. Specifically, the SRH is an IPv6 routing header. The value of a routing type field of the SRH is 4. FIG. 10 is a schematic diagram of a format of an SRH according to an embodiment of this application. The SRH includes a segment list, a segments left (SL) field, one or more TLVs, a next header field, an Hdr Ext Len field, a routing type field, a last entry field, a flag field, a tag field used to identify data packets in a same group, and the like.

There are a plurality of implementations for carrying the EPG information by using the IPv6 packet. In a possible implementation, referring to FIG. 7, the first network device uses the IPv6 extension header to carry the EPG information. Specifically, the first network device generates an IPv6 extension header including the EPG information, and adds the IPv6 extension header to the original packet, to obtain the IPv6 packet.

There are many cases of the EPG information carried in the IPv6 extension header. Case a to case c are described below as examples.

Case a: The IPv6 extension header carries the EPG information of the source endpoint device.

For example, the IPv6 extension header includes the first EPG information. An effect of case a includes: The IPv6 extension header of the IPv6 packet carries the EPG information of the source endpoint device, so that the EPG information of the source endpoint device can be forwarded along with the IPv6 packet in the IPv6 network. During forwarding of the IPv6 packet, a group based policy execution node can obtain the EPG information of the source endpoint device from the IPv6 extension header. This eliminates the workload of preconfiguring the EPG information of the source endpoint device on the group based policy execution node, simplifies the configuration of the group based policy execution node, and improves the efficiency of deploying micro-segmentation in the IPv6 network.

Case b: The IPv6 extension header carries the EPG information of the destination endpoint device.

For example, the IPv6 extension header includes the second EPG information. An effect of case b includes: The IPv6 extension header is used to transmit the EPG information of the destination endpoint device in the IPv6 network, so that during forwarding of the IPv6 packet, a group based policy execution node can obtain the EPG information of the destination endpoint device from the IPv6 extension header. This eliminates the workload of preconfiguring the EPG information of the destination endpoint device on the group based policy execution node, simplifies the configuration of the group based policy execution node, and improves the efficiency of deploying micro-segmentation in the IPv6 network.

Case c: The IPv6 extension header carries the EPG information of the source endpoint device and the EPG information of the destination endpoint device.

For example, the IPv6 extension header includes the first EPG information and the second EPG information. Effects of case c include: The IPv6 extension header is used to transmit the EPG information of the source endpoint device and the EPG information of the destination endpoint device in the IPv6 network, so that during forwarding of the IPv6 packet, a group based policy execution node can obtain the EPG information of the source endpoint device and the EPG information of the destination endpoint device from the IPv6 extension header. This eliminates the workload of preconfiguring the EPG information of the source endpoint device and the EPG information of the destination endpoint device on the group based policy execution node, simplifies the configuration of the group based policy execution node, and improves the efficiency of deploying micro-segmentation in the IPv6 network.

Figure 11:
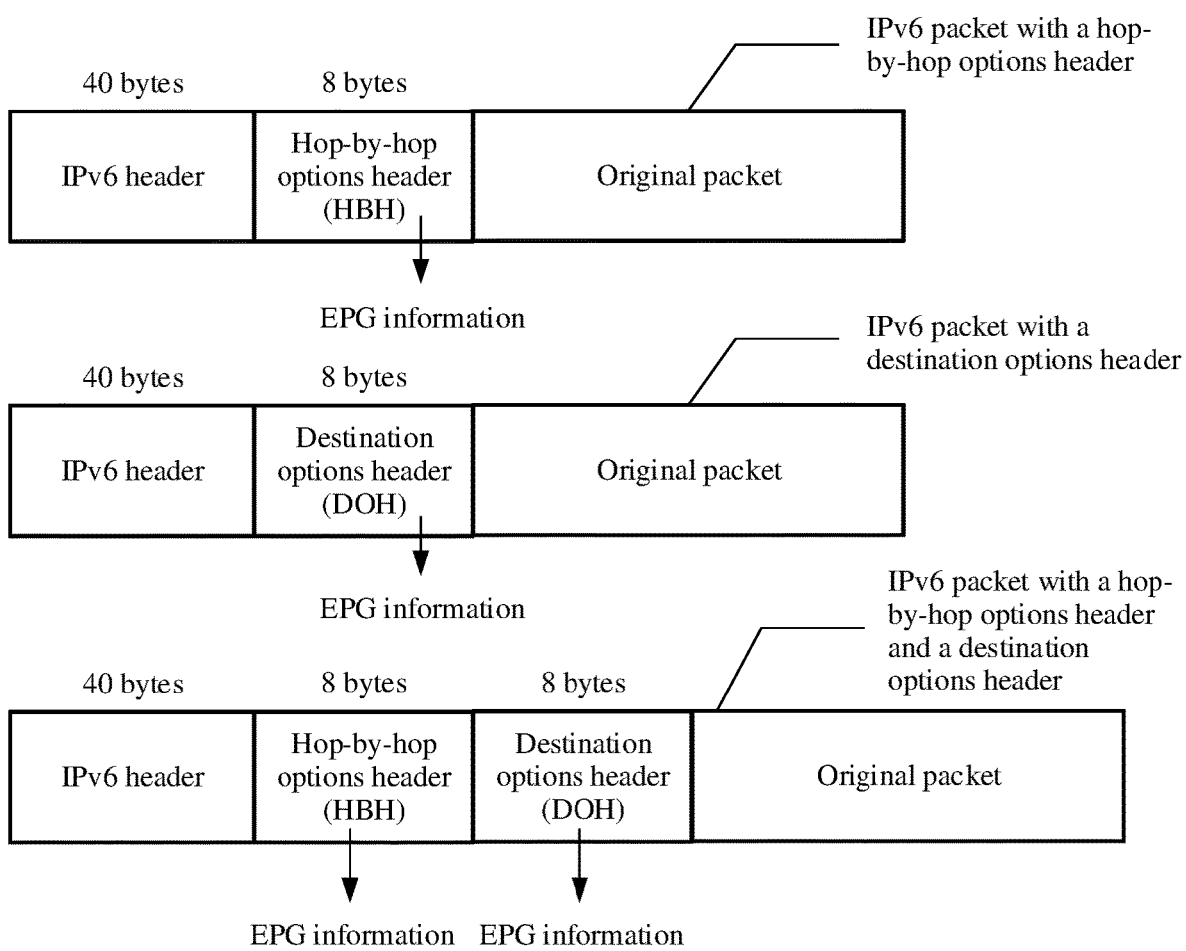
FIG. 11 is a schematic diagram of a format of an IPv6 extension header carrying EPG information according to an embodiment of this application.

With reference to a plurality of cases of the EPG information and a plurality of types of the IPv6 extension header, FIG. 11 is a schematic diagram of a format of an IPv6 extension header carrying EPG information according to an embodiment of this application. There are a plurality of implementations for carrying the EPG information by using the IPv6 extension header. Implementation 1 to implementation 3 are described below as examples.

Implementation 1: The hop-by-hop options header carries the EPG information.

In implementation 1, the IPv6 packet generated by the first network device includes the hop-by-hop options header, and the hop-by-hop options header includes the EPG information. For example, referring to an IPv6 packet having a hop-by-hop options header shown in FIG. 11, an 8-byte hop-by-hop options header exists after a 40-byte IPv6 header in the IPv6 packet, and the EPG information is located in the hop-by-hop options header. The EPG information carried in the hop-by-hop options header includes but is not limited to at least one of the EPG information of the source endpoint device or the EPG information of the destination endpoint device. Manner 1A to manner 1C are described below as examples.

Manner 1A: The hop-by-hop options header carries the EPG information of the source endpoint device and the EPG information of the destination endpoint device.

Figure 12:
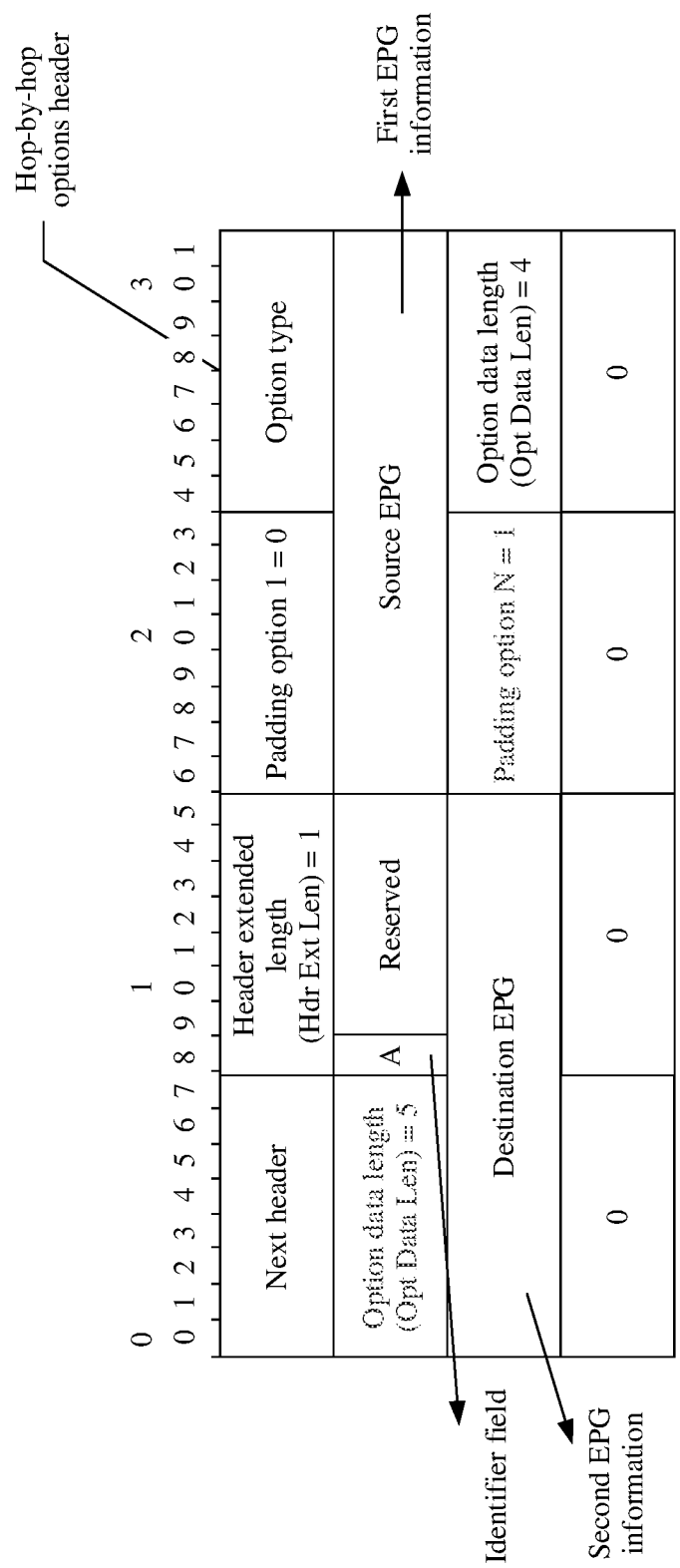
FIG. 12 is a schematic diagram of a format of a hop-by-hop options header carrying EPG information according to an embodiment of this application.

For example, the hop-by-hop options header includes the first EPG information and the second EPG information. For example, FIG. 12 shows a hop-by-hop options header including the first EPG information and the second EPG information. The hop-by-hop options header includes a source EPG field and a destination EPG field. The source EPG field includes the first EPG information, and the destination EPG field includes the second EPG information.

Manner 1B: The hop-by-hop options header carries the EPG information of the source endpoint device.

For example, the hop-by-hop options header includes the first EPG information. For example, the hop-by-hop options header includes a source EPG field, and the source EPG field includes the first EPG information.

Manner 1C: The hop-by-hop options header carries the EPG information of the destination endpoint device.

For example, the hop-by-hop options header includes the second EPG information. For example, the hop-by-hop options header includes a destination EPG field, and the destination EPG field includes the second EPG information.

Implementation 1 achieves the following effects: Because the hop-by-hop options header is an IPv6 extension header that can be parsed by a transit node, when the hop-by-hop options header carries the EPG information and the IPv6 packet passes through the transit node in a forwarding process, the transit node can obtain the EPG information of the source endpoint device and/or the EPG information of the destination endpoint device from the hop-by-hop options header. In other words, the EPG information of the source endpoint device and/or the EPG information of the destination endpoint device are visible to the transit node. Therefore, the transit node can execute a group based policy based on the EPG information of the source endpoint device and/or the EPG information of the destination endpoint device, so that a non-VTEP device such as the transit node can also serve as the group based policy execution node. In an aspect, a limitation problem that only a VTEP device can support micro-segmentation is resolved, and functions of the transit node are extended to support micro-segmentation, so that micro-segmentation can be applied to more scenarios. In another aspect, the transit node executes the group based policy, so that unnecessary forwarding can be avoided. For example, when a processing action in the group based policy is Discard, the transit node discards a packet, instead of occupying network resources to forward the packet to a destination VTEP. In still another aspect, compared with an overlay header such as a VXLAN header, the hop-by-hop options header has a simpler encapsulation format, and the hop-by-hop options header occupies fewer bytes. Therefore, packet transmission overheads can be reduced. In addition, since the hop-by-hop options header is more extensible, the hop-by-hop options header can be extended to obtain new options, to further support other features. In still another aspect, this manner can be widely applied to IPv6-capable network devices, and the transit node is not required to support SRv6-TE. Therefore, this manner is more universal. In still another aspect, because the workload of preconfiguring the EPG information of the source endpoint device and the EPG information of the destination endpoint device on the transit node is avoided, the configuration of the transit node is simplified.

Implementation 2: The destination options header carries the EPG information.

In implementation 2, the IPv6 packet generated by the first network device includes the destination options header, and the destination options header includes the EPG information. For example, referring to an IPv6 packet having a destination options header shown in FIG. 11, an 8-byte destination options header exists after a 40-byte IPv6 header in the IPv6 packet, and the EPG information is located in the destination options header. The EPG information carried in the destination options header includes but is not limited to at least one of the EPG information of the source endpoint device and the EPG information of the destination endpoint device. Manner 2A to manner 2C are described below as examples.

Manner 2A: The destination options header carries the EPG information of the source endpoint device.

Figure 13:
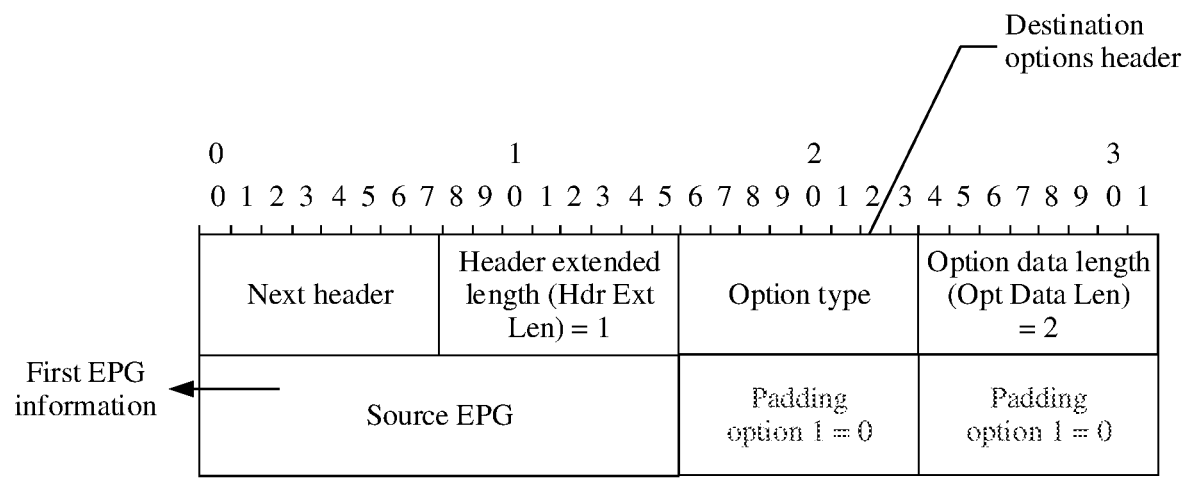
FIG. 13 is a schematic diagram of a format of a destination options header carrying EPG information according to an embodiment of this application.

For example, the destination options header includes the first EPG information. For example, FIG. 13 shows a destination options header including the first EPG information. The destination options header includes a source EPG field, and the source EPG field includes the first EPG information.

Manner 2B: The destination options header carries the EPG information of the destination endpoint device.

For example, the destination options header includes the second EPG information. For example, the destination options header includes a destination EPG field, and the destination EPG field includes the second EPG information.

Manner 2C: The destination options header carries the EPG information of the source endpoint device and the EPG information of the destination endpoint device.

For example, the destination options header includes the first EPG information and the second EPG information. For example, the destination options header includes a source EPG field and a destination EPG field, the source EPG field includes the first EPG information, and the destination EPG field includes the second EPG information.

Implementation 2 achieves the following effects: Because the destination options header is an IPv6 extension header to be parsed by a destination node, when the destination options header carries the EPG information, the destination node can be specified to execute the group based policy. In an aspect, compared with an overlay header such as the VXLAN header, the destination options header has a simpler encapsulation format, and the destination options header occupies fewer bytes. Therefore, packet transmission overheads can be reduced. In addition, since the destination options header is more extensible, the destination options header can be extended to obtain new options, to further support other features. In still another aspect, this manner can be widely applied to IPv6-capable network devices, and the transit node is not required to support SRv6-TE. Therefore, this manner is more universal. In still another aspect, because the workload of preconfiguring the EPG information of the source endpoint device on the destination node is avoided, the configuration of the destination node is simplified.

Implementation 1 to implementation 2 above may be combined to form implementation 3 below.

Implementation 3: The hop-by-hop options header and the destination options header carry the EPG information.

In implementation 3, the IPv6 packet generated by the first network device includes a hop-by-hop options header and a destination options header, and the hop-by-hop options header and the destination options header each include the EPG information. For example, referring to an IPv6 packet having a hop-by-hop options header and a destination options header shown in FIG. 11, an 8-byte hop-by-hop options header and an 8-byte destination options header exist after a 40-byte IPv6 header in the IPv6 packet, and the EPG information is located in the hop-by-hop options header and the destination options header. Optionally, the hop-by-hop options header is located before the destination options header, the hop-by-hop options header is parsed by a receive end first, and then the destination options header is parsed by the receive end. There are a plurality of implementations for carrying the EPG information by using the two IPv6 extension headers: the hop-by-hop options header and the destination options header. Manner 3A to manner 3F are described below as examples.

Manner 3A: The hop-by-hop options header carries the EPG information of the source endpoint device and the EPG information of the destination endpoint device, and the destination options header carries the EPG information of the source endpoint device.

For example, the IPv6 packet generated by the first network device includes a hop-by-hop options header and a destination options header, the hop-by-hop options header includes the first EPG information and the second EPG information, and the destination options header includes the first EPG information. In this manner, during forwarding of the IPv6 packet along a path, the transit node can obtain the EPG information of the source endpoint device and the EPG information of the destination endpoint device from the hop-by-hop options header. Therefore, the transit node can execute the group based policy based on the EPG information of the source endpoint device and the EPG information of the destination endpoint device. In addition, the destination VTEP can obtain the EPG information of the source endpoint device from the destination options header. Therefore, the destination VTEP can also execute the group based policy based on the EPG information of the source endpoint device. In this way, the transit node and the destination node can sequentially execute the group based policy for the same IPv6 packet. The group based policy executed by the transit node is the same as or different from the group based policy executed by the destination node.

Manner 3B: The hop-by-hop options header carries the EPG information of the source endpoint device, and the destination options header carries the EPG information of the source endpoint device.

For example, the IPv6 packet includes the hop-by-hop options header and the destination options header, the hop-by-hop options header includes the first EPG information, and the destination options header includes the first EPG information.

Manner 3C: The hop-by-hop options header carries the EPG information of the destination endpoint device, and the destination options header carries the EPG information of the source endpoint device.

For example, the IPv6 packet includes a hop-by-hop options header and a destination options header, the hop-by-hop options header includes the second EPG information, and the destination options header includes the first EPG information.

Manner 3D: The hop-by-hop options header carries the EPG information of the source endpoint device and the EPG information of the destination endpoint device, and the destination options header carries the EPG information of the source endpoint device and the EPG information of the destination endpoint device.

For example, the IPv6 packet includes a hop-by-hop options header and a destination options header, the hop-by-hop options header includes the first EPG information and the second EPG information, and the destination options header includes the first EPG information and the second EPG information.

Manner 3E: The IPv6 packet includes a hop-by-hop options header and a destination options header, the hop-by-hop options header includes the first EPG information, and the destination options header includes the first EPG information and the second EPG information.

Manner 3F: The IPv6 packet includes a hop-by-hop options header and a destination options header, the hop-by-hop options header includes the second EPG information, and the destination options header includes the first EPG information and the second EPG information.

Some possible implementations of carrying the EPG information by using the IPv6 extension header are listed above by using implementation 1 to implementation 3. In addition to the hop-by-hop options header and the destination options header, the IPv6 extension header further includes an IPv6 routing header. Optionally, the IPv6 routing header (for example, an SRH) does not carry the EPG information. In other words, the EPG information is not in the IPv6 routing header (for example, an SRH). There are a plurality of cases in which the EPG information is not in the IPv6 routing header. For example, the IPv6 packet does not carry the IPv6 routing header. For another example, the IPv6 packet carries the IPv6 routing header but the EPG information is not in the IPv6 routing header. For example, the IPv6 packet includes the hop-by-hop options header but does not include the IPv6 routing header (for example, the SRH), and the EPG information is located in the hop-by-hop options header. For another example, the IPv6 packet includes the hop-by-hop options header and the IPv6 routing header (for example, the SRH), and the EPG information is located in the hop-by-hop options header instead of the IPv6 routing header. For example, the IPv6 packet includes the destination options header but does not include the IPv6 routing header (for example, the SRH), and the EPG information is located in the destination options header. For another example, the IPv6 packet includes the destination options header and the IPv6 routing header (for example, the SRH), and the EPG information is located in the destination options header instead of the IPv6 routing header.

Optionally, an identifier field is carried in the IPv6 packet to indicate whether a group based policy has been executed. Specifically, the IPv6 packet includes an identifier field, and the identifier field indicates whether the IPv6 packet has been processed according to a group based policy corresponding to the EPG information. For example, the identifier field occupies one bit in the IPv6 packet. If the bit is set, it indicates that the IPv6 packet has been processed according to the group based policy. Alternatively, if the bit is not set, it indicates that the IPv6 packet has not been processed according to the group based policy. Optionally, the identifier field is referred to as an "A" bit.

There are a plurality of implementations for carrying the identifier field by using the IPv6 packet. For example, the IPv6 extension header carries the identifier field. For example, the hop-by-hop options header carries the identifier field, or the destination options header carries the identifier field. There are a plurality of cases of a location relationship between the identifier field and the EPG information. Optionally, the identifier field and the EPG information are in a same IPv6 extension header. For example, the identifier field and the EPG information are in a same hop-by-hop options header. For another example, the identifier field and the EPG information are in a same destination options header. For another example, the identifier field and the EPG information are in a same option. For another example, the identifier field and the EPG information are in a same TLV. For another example, the identifier field and the EPG information are in a same field. For example, there is a flag field in the IPv6 packet, a high-order bit of the flag field is the identifier field, and a low-order bit of the flag field carries the EPG information.

The IPv6 packet carries the identifier field. When the IPv6 packet passes through each node, if an upstream node has executed the group based policy, the upstream node may identify, by using the identifier field, that the group based policy has been executed, so that a downstream node does not need to re-execute the group based policy. In a scenario in which a same group based policy needs to be executed only once along a path, the requirements of this scenario can be met, and the processing overheads of a node following the group based policy execution node are reduced.

There are a plurality of implementations for carrying the EPG information by using specific fields in the IPv6 extension header. Optionally, a new TLV obtained by extending the IPv6 extension header carries the EPG information. Specifically, the TLV is an encoding format. One TLV includes a type field, a length field, and a value field. The IPv6 extension header in the IPv6 packet includes the TLV, and the EPG information is located in the value field of the TLV.

For example, a TLV carrying the EPG information is referred to as a group based policy TLV. The group based policy TLV is a TLV carrying the EPG information. A value field of the group based policy TLV includes the EPG information. There are many cases of the type of the group based policy TLV. Optionally, the group based policy TLV is a new top TLV, and the value of a type field of the group based policy TLV indicates a type of unused top TLVs. Optionally, the group based policy TLV is a new sub-TLV of a top TLV, and the value of a type field of the group based policy TLV indicates a type of unused sub-TLVs. Optionally, the group based policy TLV is a new sub-sub-TLV of a top TLV, and the type of the group based policy TLV is a type of unused sub-sub-TLVs. Whether the group based policy TLV is a top TLV, a sub-TLV, or a sub-sub-TLV is not limited in this embodiment. A length field of the group based policy TLV indicates a length of the group based policy TLV.

There are a plurality of implementations for carrying the EPG information by using the TLV. Implementation I and implementation II are described below as examples.

Implementation I: One TLV carries at least one of the EPG information of the source endpoint device or the EPG information of the destination endpoint device.

For example, one group based policy TLV carries the EPG information of the source endpoint device, a value field of the group based policy TLV includes a source EPG field, and the source EPG field includes the first EPG information. For another example, one group based policy TLV carries the EPG information of the destination endpoint device, a value field of the group based policy TLV includes a destination EPG field, and the destination EPG field includes the second EPG information. For another example, one group based policy TLV carries the EPG information of the source endpoint device and the EPG information of the destination endpoint device, a value field of the group based policy TLV includes the EPG information of the source endpoint device and a destination EPG field, a source EPG field includes the first EPG information, and the destination EPG field includes the second EPG information. When one group based policy TLV carries the EPG information of the source endpoint device and the EPG information of the destination endpoint device, optionally, the EPG information of the source endpoint device and the EPG information of the destination endpoint device occupy different bits, and whether the EPG information is the EPG information of the source endpoint device or the EPG information of the destination endpoint device is determined based on a bit in which the EPG information is located.

Implementation II: A plurality of TLVs separately carry the EPG information of the source endpoint device and the EPG information of the destination endpoint device.

For example, group based policies TLVs include a source group based policy TLV and a destination group based policy TLV, a value field of the source group based policy TLV includes a source EPG field, and the source EPG field includes the first EPG information. A value field of the destination group based policy TLV includes a destination EPG field, and the destination EPG field includes the second EPG information. Optionally, a type field of the source group based policy TLV and a type field of the destination group based policy TLV have different values. In other words, the source group based policy TLV and the destination group based policy TLV are distinguished by using different types. Alternatively, the source group based policy TLV and the destination group based policy TLV each include a flag field, and the flag field of the source group based policy TLV and the flag field of the destination group based policy TLV have different values. In other words, the source group based policy TLV and the destination group based policy TLV are distinguished by using different flags. For example, FIG. 14 and FIG. 15 describe examples of the group based policy TLV.

Figure 14:
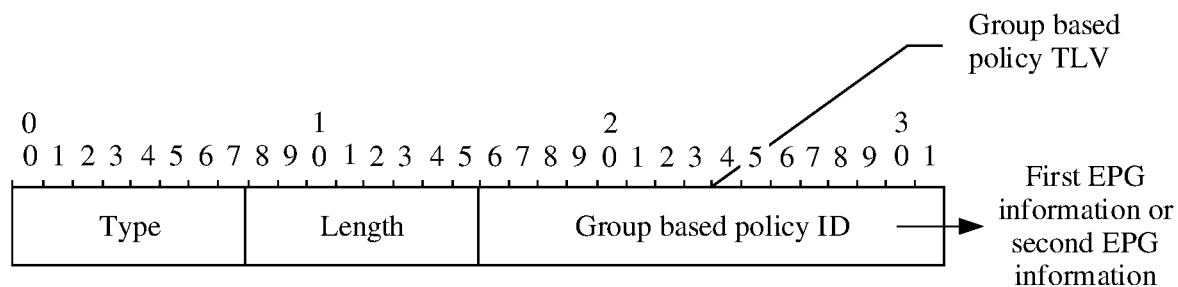
FIG. 14 is a schematic diagram of a format of a group based policy TLV according to an embodiment of this application.

An EPG field in the group based policy TLV shown in FIG. 14 carries EPG information of one endpoint device, for example, carry the EPG information of the source endpoint device and the EPG information of the destination endpoint device. The EPG field in the group based policy TLV shown in FIG. 14 occupies, for example, two bytes, and the value of the length field of the group based policy TLV is, for example, 2.

Figure 15:
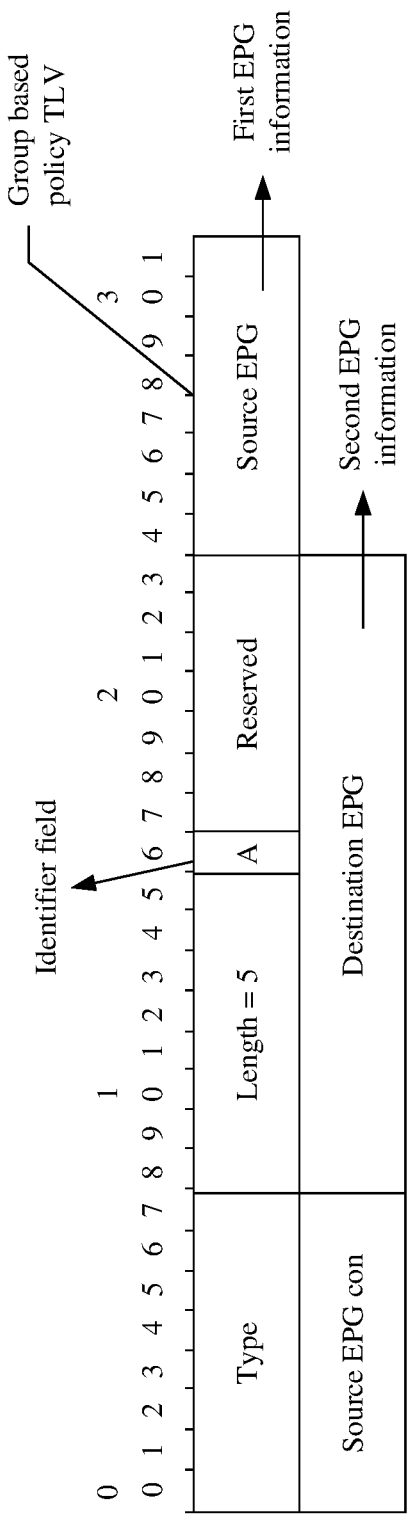
FIG. 15 is a schematic diagram of a format of a group based policy TLV according to an embodiment of this application.

The group based policy TLV shown in FIG. 15 carries the EPG information of the source endpoint device, the EPG information of the destination endpoint device, and the identifier field. The source EPG field occupies, for example, two bytes, the destination EPG field occupies, for example, two bytes, and the identifier field occupies one bit. The value of the length field of the group based policy TLV is, for example, greater than 4, and is, for example, 5. The group based policy TLV shown in FIG. 15 includes an option type (OptionType) field, an option data length (Opt Data Len) field, an identifier field, a reserved field, a source EPG field, and a destination EPG field. The value of the OptType field is 5, and indicates that the length from the first byte after OptLen to the last byte of the option is five bytes. The source EPG field includes the first EPG information. The destination EPG field includes the second EPG information. Source EPG and source EPG con shown in FIG. 15 are a same field. A meaning of such a drawing is: A row in FIG. 15 represents 32 bits, the source EPG field includes the last byte of the first row and the first byte of the second row, the source EPG field has not ended until the last byte of the first row, and the first byte of the second row needs to be continuously read.

A new TLV is obtained by extending the IPv6 extension header to carry the EPG information, so that the network device can obtain the EPG information from the new TLV. Because the workload of configuring a correspondence between an IP address and EPG information is avoided, the configuration of the network device is simplified.

With reference to different types of the IPv6 extension header, there are many cases of carrying the group based policy TLV by using the IPv6 extension header. Case (1) and case (2) are described below as examples.

Case (1): The hop-by-hop options header carries the group based policy TLV.

The IPv6 packet generated by the first network device includes a hop-by-hop options header, and the hop-by-hop options header includes one or more group based policies TLVs. For example, FIG. 12 describes an example of carrying a group based policy TLV by using a hop-by-hop options header. The group based policy TLV shown in FIG. 12 includes the EPG information (the first EPG information) of the source endpoint device, the EPG information (the second EPG information) of the destination endpoint device, and the identifier field. In addition, optionally, the hop-by-hop options header further includes a padding field, and the padding field is used for alignment.

Case (2): The destination options header carries the group based policy TLV.

The IPv6 packet generated by the first network device includes a destination options header, and the destination options header includes one or more group based policies TLVs. For example, FIG. 13 is an example of carrying a group based policy TLV by using a destination options header. The group based policy TLV shown in FIG. 13 includes the EPG information (the first EPG information) of the source endpoint device. In addition, optionally, the destination options header further includes a two-byte padding field, and the padding field is used for alignment.

Case (1) and case (2) above may be combined, that is, the hop-by-hop options header and the destination options header carry the group based policy TLV. Specifically, the IPv6 packet includes a hop-by-hop options header and a destination options header, and the hop-by-hop options header and the destination options header each include the group based policy TLV. For a case in which the hop-by-hop options header and the destination options header each include the group based policy TLV, refer to manner 3A to manner 3F above. For example, referring to manner 3A above, the group based policy TLV in the hop-by-hop options header includes the first EPG information and the second EPG information, and the group based policy TLV in the destination options header includes the first EPG information.

It is an optional manner to carry the EPG information by using a new TLV obtained through extension. In some other embodiments, the IPv6 extension header carries the EPG information in other manners instead of in a new TLV obtained through extension. For example, the flag field in the IPv6 extension header carries the EPG information, so that overheads caused by the type field and the length field of the policy TLV are reduced. Optionally, the flag field carrying the EPG information is located in a reserved field, the flag field carrying the EPG information is located in a V field of a TLV, or the flag field carrying the EPG information occupies one or more bits in an original flag field.

Figure 16:
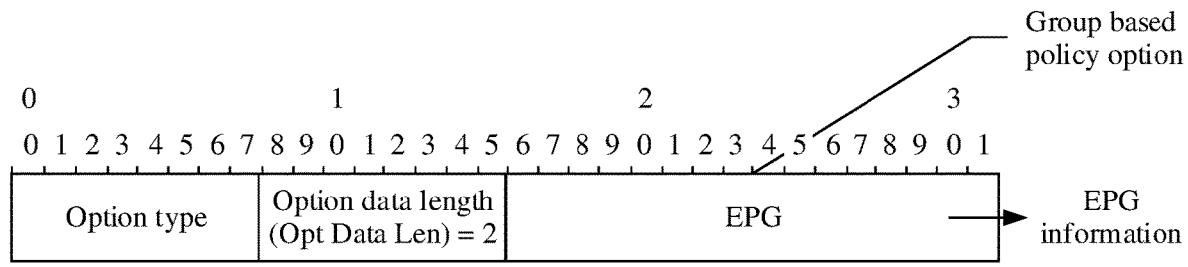
FIG. 16 is a schematic diagram of a format of a group based policy option according to an embodiment of this application.

Optionally, the IPv6 extension header is extended to obtain a new option (Option) to carry the EPG information. Specifically, the IPv6 extension header in the IPv6 packet includes one or more options, and the EPG information is located in the one or more options. For example, an option carrying the EPG information is referred to as a group based policy option. Optionally, a hop-by-hop options header carries the group based policy option, so that the hop-by-hop options header includes one or more group based policy options. Alternatively, a destination options header carries the group based policy option, so that the destination options header includes one or more group based policy options. The group based policy options may be encoded in a form of TLVs. For example, the type field of the group based policy TLV shown in FIG. 14 or FIG. 15 is replaced with an option type, and the length field of the group based policy TLV shown in FIG. 14 or FIG. 15 is replaced with an option data length (Opt Data Len) field, so as to obtain the form of the group based policy option. For example, FIG. 16 describes an example of the group based policy option. The value of the OptLen field in FIG. 16 is 2, and indicates that the length from the first bit following OptLen to the last bit of the option is two bytes. The EPG field occupies two bytes.

There are many cases of carrying the EPG information by using the group based policy option. Manner 1 and manner 2 are described below as examples.

Manner 1: One group based policy option carries the EPG information.

For example, one group based policy option carries the EPG information of the source endpoint device. For example, the IPv6 extension header includes one group based policy option, and the group based policy option includes the first EPG information.

For another example, one group based policy option carries the EPG information of the destination endpoint device. For example, the IPv6 extension header includes one group based policy option, and the group based policy option includes the second EPG information.

For another example, one group based policy option carries the EPG information of the source endpoint device and the EPG information of the destination endpoint device, so that the EPG information of the source endpoint device and the EPG information of the destination endpoint device are located in a same option. For example, the IPv6 extension header includes one group based policy option, and the group based policy option includes the first EPG information and the second EPG information.

Manner 2: A plurality of group based policy options carry the EPG information.

For example, different group based policy options carry EPG information of different endpoint devices. For example, a source group based policy option carries the EPG information of the source endpoint device, and a destination group based policy option carries the EPG information of the destination endpoint device. For example, the source group based policy option includes the first EPG information, and the destination group based policy option includes the second EPG information. In other words, the first EPG information and the second EPG information are located in different options.

The source group based policy option and the destination group based policy option are located in a same IPv6 extension header or different IPv6 extension headers. For example, one hop-by-hop options header carries the source group based policy option and the destination group based policy option. For another example, a hop-by-hop options header carries the destination group based policy option, and a destination options header carries the source group based policy option. Optionally, the source group based policy option and the destination group based policy option have different option types, or the source group based policy option and the destination group based policy option have a same option type, and are distinguished by using a flag field or another field.

A new option is obtained by extending the IPv6 extension header to carry the EPG information, so that the network device can obtain the EPG information from the new option, and the configuration of the network device is simplified.

Optionally, not only IPv6 is used to transmit the EPG information, but also a segment routing-best effort (SR-BE) technology is used for tenant isolation. Specifically, the IPv6 packet generated by the first network device is an SRv6-BE packet, the IPv6 packet does not include an SRH, the IPv6 packet includes an outer IPv6 header of the original packet, a destination IP address of the IPv6 header includes a virtual private network segment identifier (VPN SID), and traffic of different tenants is distinguished by using different VPN SIDs for tenant isolation.

Figure 17:
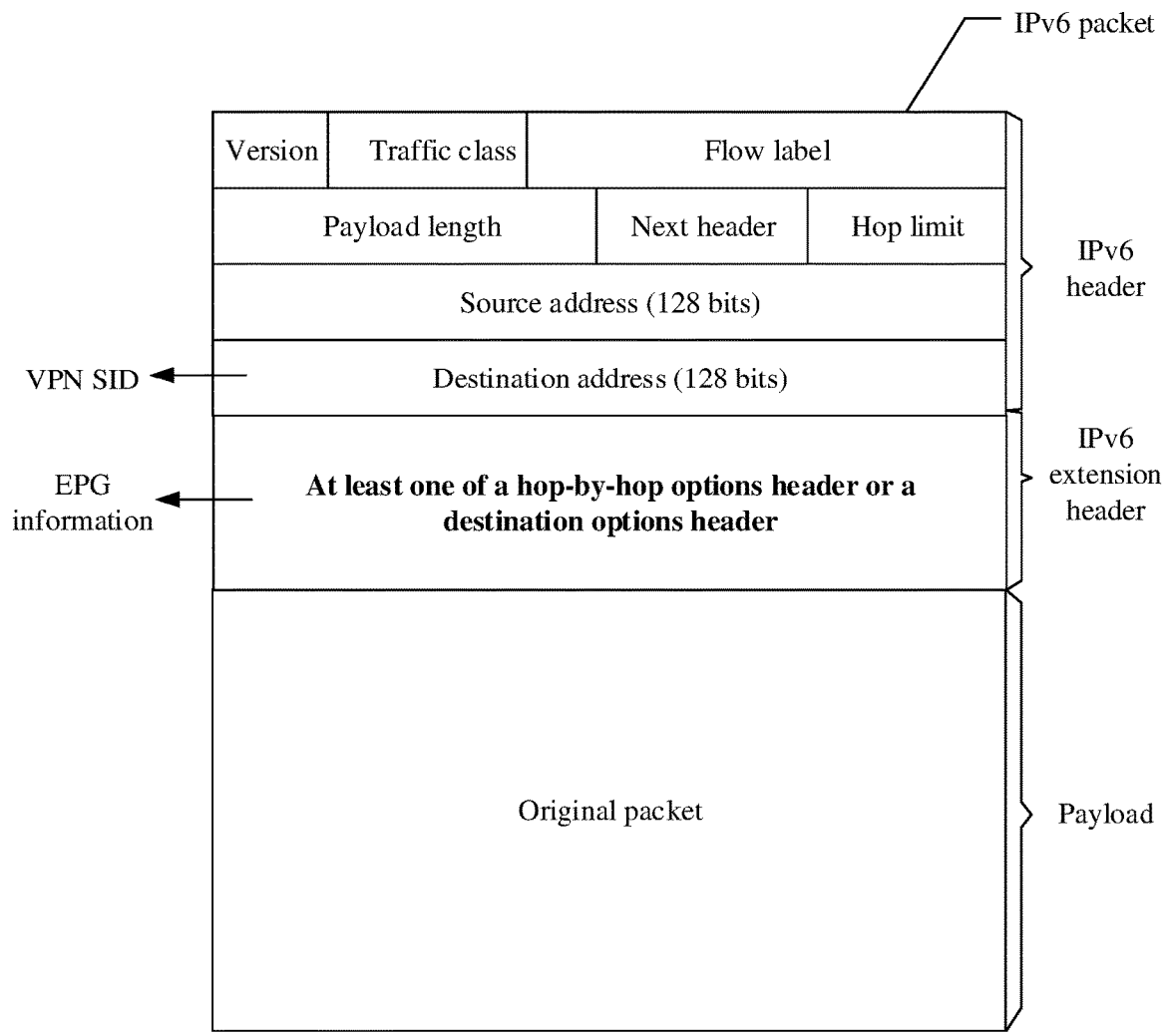
FIG. 17 is a schematic diagram of a format of an IPv6 packet carrying EPG information and a VPN SID according to an embodiment of this application.

This paragraph describes the VPN SID. The VPN SID is an Internet Protocol version 6 for segment routing (SRv6 for short) segment identifier (Segment ID, SID). The VPN SID can serve as a virtual private network identifier (Virtual Private Network ID, VPN ID). The VPN SID can identify a corresponding VPN. Optionally, in the method 200, the VPN SID is a SID published by the destination VTEP device in advance, location information (Locator) of the VPN SID is used to locate the destination VTEP device, and function information of the VPN SID indicates the destination VTEP device to send a packet to a VPN instance. The VPN SID is used as the destination IP address of the IPv6 header. When the destination VTEP receives an IPv6 packet, and searches a local SID table based on the destination IP address, if the destination IP address hits a VPN SID in the local SID table, the destination VTEP performs an operation corresponding to the VPN SID and forwards the IPv6 packet to a corresponding VPN instance. In this way, the IPv6 packet enters a corresponding VPN from the destination VTEP, so that tenants are isolated. There are a plurality of cases of a location relationship between the VPN SID and the EPG information in the IPv6 packet. For example, the VPN SID is located at the outer layer of the EPG information. For example, referring to FIG. 17, the IPv6 packet sequentially includes an IPv6 header of a VPN SID, an IPv6 extension header carrying EPG information, and an original packet from outside to inside. Types of the VPN SID include but are not limited to End.DX and End.DT. Operations corresponding to an End.DX SID include decapsulating an outer IPv6 header of a packet and forwarding the remaining packet through an outbound interface bound to the End.DX SID. End.DX includes but is not limited to End.DX6, End.DX4, End.DX2, or End.DX2V. Operations corresponding to an End.DT SID include decapsulating an outer IPv6 header of a packet, searching a VPN instance routing table based on a destination address carried in the remaining packet, and forwarding the packet. End.DT includes but is not limited to End.DT4 or End.DT6.

The following compares various encapsulation forms of the EPG information in best effort (Best effort) conditions.

Figure 18:
FIG. 18 is a schematic diagram of header overheads of encapsulating EPG information according to an embodiment of this application.

For various encapsulation forms carrying one piece of EPG information, for example, carrying the EPG information of the source endpoint device, refer to FIG. 18. When a VXLAN packet is used to encapsulate the first EPG information, an outer IPv6 header occupies 40 bytes, a UDP header occupies eight bytes, and a VXLAN header carrying the first EPG information occupies eight bytes. When a VXLAN-GPE packet is used to encapsulate the first EPG information, an outer IPv6 header occupies 40 bytes, a UDP header occupies eight bytes, and a VXLAN-GPE header occupies eight bytes. The first EPG information occupies four bytes. When a GENEVE packet is used to encapsulate the first EPG information, an outer IPv6 header occupies 40 bytes, a UDP header occupies eight bytes, and a GENEVE header occupies eight bytes. The first EPG information occupies eight bytes. When an IPv6 (SRv6-BE) header and a destination options header are used to encapsulate the first EPG information, an outer IPv6 header occupies 40 bytes, and the destination options header carrying the first EPG information occupies eight bytes. When an IPv6 (SRv6-BE) header and a hop-by-hop options header are used to encapsulate the first EPG information, an outer IPv6 header occupies 40 bytes, and the hop-by-hop options header carrying the first EPG information occupies eight bytes. It can be learned through comparison that, when a same function is implemented, the SRv6-BE header and the hop-by-hop options header or the SRv6-BE header and the destination options header require eight fewer bytes than the VXLAN header, 12 fewer bytes than the VXLAN-GPE header, and 16 fewer bytes than the GENEVE header to carry the first EPG information. Similarly, when the EPG information (the second EPG information) of the destination endpoint device is carried, when a same function is implemented, the SRv6-BE header and the hop-by-hop options header or the SRv6-BE header and the destination options header require eight fewer bytes than the VXLAN header, 12 fewer bytes than the VXLAN-GPE header, and 16 fewer bytes than the GENEVE header to carry the second EPG information. Obviously, under the premise of achieving the same effect as other encapsulation forms, the encapsulation form using the SRv6-BE header and the IPv6 extension header is simpler, which significantly reduces the header overheads.

Figure 19:
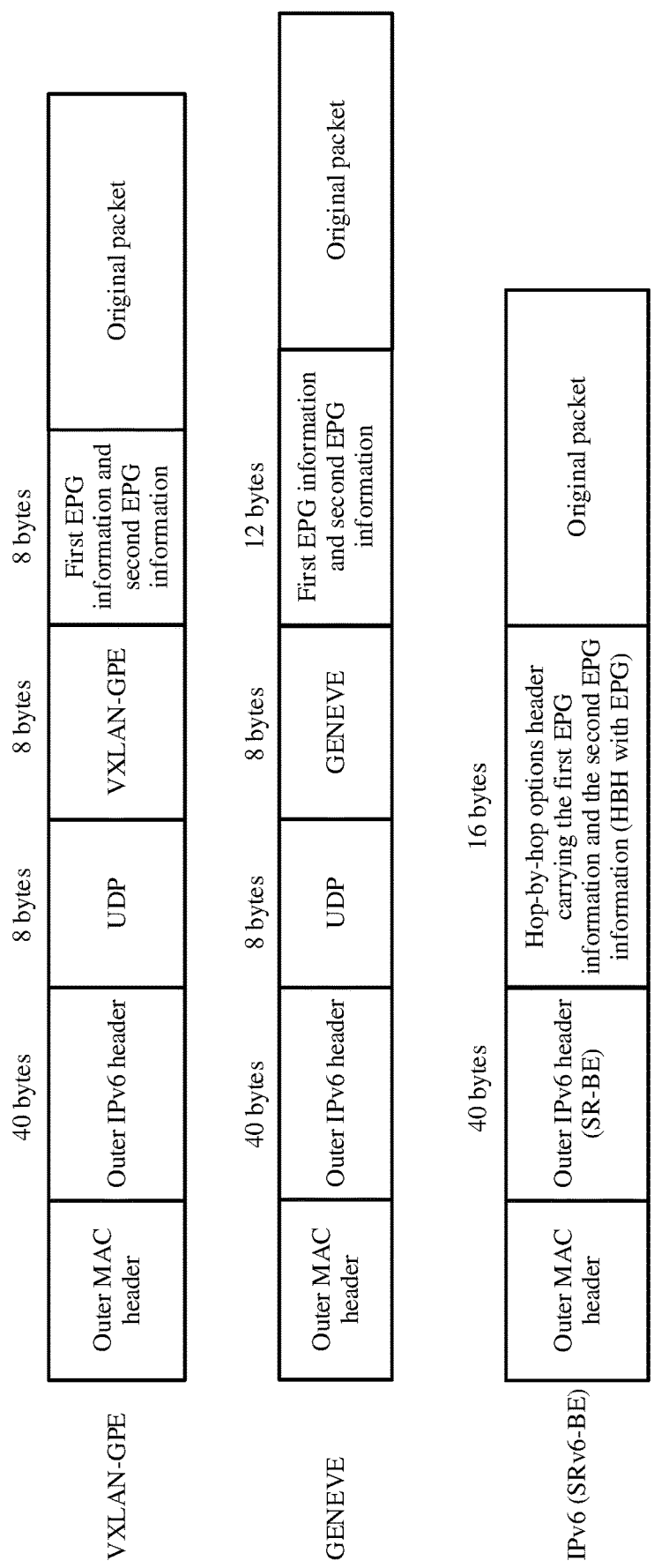
FIG. 19 is a schematic diagram of header overheads of encapsulating EPG information according to an embodiment of this application.

For various encapsulation forms carrying two pieces of EPG information, for example, carrying the first EPG information and the second EPG information, refer to FIG. 19. When a same function is implemented, the SRv6-BE header and the hop-by-hop options header require eight fewer bytes than the VXLAN-GPE header, and 12 fewer bytes than the GENEVE header to carry the first EPG information and the second EPG information. Obviously, under the premise of achieving the same effect as other encapsulation forms, the encapsulation form using the SRv6-BE header and the hop-by-hop options header is simpler, which significantly reduces the header overheads.

There are many specific manners for adding the IPv6 extension header. Manner a and manner b are described below as examples.

Manner a: The IPv6 extension header is added through encapsulation.

Optionally, the first network device generates an IPv6 header and an IPv6 extension header, and adds the IPv6 header and the IPv6 extension header to the outer layer of the original packet by using the original packet as a payload, to obtain an IPv6 packet. In this way, the IPv6 packet is generated. When the original packet is an IP packet, the IPv6 packet generated in manner a is in a form of a mobile IP data encapsulation and tunnel (IP in IP) packet, the generated IPv6 packet includes a plurality of IP headers, the outer IP header includes the added IPv6 extension header, and the inner IP header includes an IP header of the original packet. For example, if the original packet is an IPv6 packet, the IPv6 packet generated in manner a includes two IPv6 headers, the outer IPv6 header is added by the first network device, and the inner IPv6 header is an IPv6 header of the original packet. For another example, if the original packet is an IPv4 packet, the IPv6 packet generated in manner a includes an IPv6 header and an IPv4 header, the outer IPv6 header is added by the first network device, and the inner IPv4 header is an IPv4 header of the original packet.

Manner b: The IPv6 extension header is added through insertion (insert).

Specifically, the first network device generates an IPv6 extension header, and inserts the IPv6 extension header between an IPv6 header of the original packet and a payload of the original packet, to generate the IPv6 packet.

Optionally, in manner b, the first network device does not need to generate and add an outer IPv6 header, but generates an IPv6 packet by using an original IPv6 header of the original packet.

S204. The first network device sends the IPv6 packet.

After the first network device sends the IPv6 packet to a second network device, because the IPv6 packet includes the original packet and the EPG information, the original packet and the EPG information is transferred together to the second network device.

S205. The second network device in the IPv6 network receives the IPv6 packet.

Optionally, after receiving the IPv6 packet, the second network device first identifies an identifier field in the IPv6 packet, and the second network device determines, based on a value of the identifier field, whether the IPv6 packet has been processed according to a group based policy. If the second network device determines, based on the identifier field, that the IPv6 packet has not been processed according to the group based policy, that is, the group based policy has not been executed by an upstream node, the second network device performs S206 below.

If the second network device determines, based on the identifier field, that the IPv6 packet has been processed according to the group based policy, that is, the group based policy has been executed by the upstream node, there are many cases of actions executed by the second network device. Optionally, if the group based policy has been executed by the upstream node, the second network device does not execute the group based policy, that is, the second network device does not perform S206 and S207 below, and skips S206 and S207 to perform S208. For example, when the identifier field occupies one bit in the IPv6 packet, the second network device determines whether the identifier field is set. If the identifier field is not set, the second network device determines that the IPv6 packet has not been processed according to the group based policy, and performs S206 below. If the identifier field has been set, the second network device determines that the IPv6 packet has been processed according to the group based policy, and the second network device skips performing S206 below and forwards the IPv6 packet.

Optionally, this technical means is applied to a scenario in which a transit node supports a micro-segmentation function. For example, if both the transit node and the destination VTEP device that the IPv6 packet passes through support the micro-segmentation function, after the IPv6 packet is processed by the transit node according to the group based policy, as indicated by the identifier field, the destination VTEP device (the second network device) no longer processes the IPv6 packet according to the group based policy. For another example, if a plurality of hops of transit nodes that the IPv6 packet passes through support the micro-segmentation function, after the IPv6 packet is processed by a hop of transit node according to the group based policy, as indicated by the identifier field, a downstream transit node of the transit node that executes the group based policy no longer processes the IPv6 packet according to the group based policy. In this way, it can be specified that the IPv6 packet is processed by only one hop of transit node, so that forwarding delays and processing overheads caused by executing a same group based policy by different nodes are avoided.

S206. The second network device obtains the EPG information from the IPv6 extension header.

With reference to different cases of carrying the EPG information, there are also a plurality of cases of obtaining the EPG information. Case 1 to case 3 are described below as examples.

Case 1: The second network device obtains the EPG information from the hop-by-hop options header.

For example, the second network device obtains the first EPG information from the hop-by-hop options header. For another example, the second network device obtains the first EPG information and the second EPG information from the hop-by-hop options header. For another example, the second network device obtains the second EPG information from the hop-by-hop options header.

Case 2: The second network device obtains the EPG information from the destination options header.

For example, the second network device obtains the first EPG information from the destination options header. For another example, the second network device obtains the first EPG information and the second EPG information from the destination options header. For another example, the second network device obtains the second EPG information from the destination options header.

Case 3: The second network device obtains different EPG information from the hop-by-hop options header and the destination options header.

For example, the second network device obtains the first EPG information from the hop-by-hop options header, and obtains the second EPG information from the destination options header. For another example, the second network device obtains the second EPG information from the hop-by-hop options header, and obtains the first EPG information from the destination options header.

S207. The second network device processes the IPv6 packet according to the group based policy corresponding to the EPG information.

Optionally, the second network device obtains the group based policy based on the EPG information in the IPv6 packet. Specifically, the second network device obtains and stores the group based policy in advance. After receiving the IPv6 packet, the second network device obtains the EPG information from the IPv6 packet, and finds, based on the EPG information, the group based policy stored in advance. There are a plurality of implementations for a location for storing the group based policy. Optionally, the second network device stores the group based policy in a GBP entry.

There are a plurality of implementations for obtaining the group based policy. Manner 1 and manner 2 are described below as examples.

Manner 1: Static Configuration.

Specifically, the second network device receives a configuration instruction, and the second network device obtains the group based policy according to the configuration instruction. Optionally, the configuration instruction is triggered by a configuration operation of an operation and maintenance person. Alternatively, the configuration instruction is delivered by a network management system or a network application to the second network device.

Manner 2: Preset in Production.

For example, the second network device stores the group based policy before delivery through programming performed in a processor, or in another hard coding manner.

There are a plurality of implementations for processing a packet according to the group based policy. Specifically, the second network device queries a policy matrix based on the EPG information carried in the IPv6 packet, and matches the EPG information carried in the IPv6 packet with a matching condition. When the EPG information carried in the IPv6 packet matches the matching condition, the second network device executes a group based policy corresponding to the matching condition. The process of executing the group based policy is the process of processing the IPv6 packet according to the group based policy.

Matching include strict matching and longest prefix matching. Strict matching means that when the EPG information in the IPv6 packet completely meets the matching condition, it is determined that the EPG information meets the matching condition. When strict matching is used, a processing action corresponding to the matching condition that is fully met is performed. Longest prefix matching means that a matching length between the EPG information in the IPv6 packet and each matching condition is determined, a matching condition with a longest prefix matching length is found, and the matching condition with the longest prefix matching length is used as the matching condition that is met. When longest prefix matching is used, a processing action corresponding to the matching condition with the longest prefix matching length is performed. Optionally, when there are a plurality of group based policies with equal matching lengths, a group based policy that is first hit is executed, or a group based policy that is finally hit is executed, or a group based policy hit with the highest priority is executed. There are a plurality of implementations for calculating the matching length. For example, the first EPG information is matched with the EPG information of the source endpoint device in a matching condition, and if the two pieces of EPG information match, the matching length is increased by one. In addition, the second EPG information is matched with the EPG information of the destination endpoint device in a matching condition, and if the two pieces of EPG information match, the matching length is increased by one.

When the IPv6 packet carries the EPG information of the source endpoint device but does not carry the EPG information of the destination endpoint device, the IPv6 packet carries the EPG information of the destination endpoint device but does not carry the EPG information of the source endpoint device, or the IPv6 packet carries the EPG information of the source endpoint device and the EPG information of the destination endpoint device, the second network device can perform S207 to implement the micro-segmentation function. Implementation A to implementation C below are used as examples to describe how to implement micro-segmentation when the IPv6 packet carries either the EPG information of the source endpoint device and the EPG information of the destination endpoint device.

Implementation A: Prestore a correspondence between an IP address and EPG information.

Specifically, the second network device prestores a correspondence between an IP address and EPG information of an endpoint device. When the IPv6 packet carries the EPG information of the source endpoint device but does not carry the EPG information of the destination endpoint device, when receiving the IPv6 packet, the second network device not only obtains the first EPG information from the IPv6 extension header of the IPv6 packet, but also queries the correspondence between the IP address and the EPG information based on the destination IP address included in the IPv6 packet, to obtain the second EPG information, and processes the IPv6 packet according to the group based policy corresponding to the first EPG information and the second EPG information. When the IPv6 packet carries the EPG information of the destination endpoint device but does not carry the EPG information of the source endpoint device, when receiving the IPv6 packet, the second network device not only obtains the second EPG information from the IPv6 extension header of the IPv6 packet, but also queries the correspondence between the IP address and the EPG information based on the source IP address included in the IPv6 packet, to obtain the first EPG information, and processes the IPv6 packet according to the group based policy corresponding to the first EPG information and the second EPG information.

Implementation B: The matching condition of the group based policy includes either the EPG information of the source endpoint device or the EPG information of the destination endpoint device.

For example, the matching condition of the group based policy includes the EPG information of the source endpoint device but does not include the EPG information of the destination endpoint device. For example, the matching condition of the group based policy is EPG 1 to *. When receiving the IPv6 packet, the second network device obtains the first EPG information from the IPv6 extension header of the IPv6 packet, and matches the first EPG information with EPG 1. In this implementation, the IPv6 packet can carry only the EPG information of the source endpoint device but does not carry the EPG information of the destination endpoint device.

For another example, the second network device is a device such as a firewall, and the matching condition corresponding to the group based policy includes the EPG information of the destination endpoint device but does not include the EPG information of the source endpoint device. For example, the matching condition of the group based policy is * to EPG 1. When receiving the IPv6 packet, the second network device obtains the second EPG information from the IPv6 extension header of the IPv6 packet, and matches the second EPG information with EPG 1. In this implementation, the IPv6 packet can carry only the EPG information of the destination endpoint device but does not carry the EPG information of the source endpoint device.

Implementation C: Search for a group based policy through longest prefix matching.

For example, when it is determined whether the EPG information in the IPv6 packet matches EPG information in a matching condition of the group based policy, it is not required that EPG information of a source endpoint device and EPG information of a destination endpoint device in the group based policy should be matched. When either of the EPG information of the source endpoint device and the EPG information of the destination endpoint device in the group based policy is matched, the matching length between the group based policy and the IPv6 packet is increased by one. In this case, when the IPv6 packet carries either the EPG information of the source endpoint device or the EPG information of the destination endpoint device, a group based policy matching either the EPG information of the source endpoint device or the EPG information of the destination endpoint device may be executed.

There are a plurality of cases of processing a packet according to a group based policy. S2071 to S2074 are described below as examples.

S2071. When the group based policy is Discard, the second network device discards the IPv6 packet, and the process ends.

S2072. When the group based policy is Mirror, the second network device mirrors the IPv6 packet to a specified address, and the process ends.

S2073. When the group based policy is Redirect, the second network device modifies the destination address of the IPv6 packet, and the process ends.

S2074. When the group based policy is Forward or Remark, the second network device performs S308 below.

S208. The second network device sends the original packet.

Specifically, the second network device forwards the IPv6 packet based on a destination IP address of an outer IPv6 header in the IPv6 packet. In a forwarding process, the second network device sends at least the original packet in the IPv6 packet. As to whether to send the outer IPv6 header and the IPv6 extension header, there are a plurality of cases. Case A to case C are described below as examples.

Case A: The second network device removes the outer IPv6 header and the IPv6 extension header, and sends the inner original packet. Case A is applicable to a scenario in which the second network device is the destination VTEP device.

Case B: The second network device removes the IPv6 extension header, and sends the outer IPv6 header and the inner original packet.

In case B, the second network device does not remove the outer IPv6 header. Case B1 and case B2 are described below as examples.

Case B1: The outer IPv6 header is to be routed and forwarded by a downstream transit node.

Case B1 is applicable to a scenario in which the second network device is a transit node. For example, after executing the group based policy based on the EPG information in the IPv6 extension header (such as the hop-by-hop options header), the transit node removes the IPv6 extension header and forwards the remaining IPv6 packet to a next-hop transit node. The remaining IPv6 packet includes the outer IPv6 header and the inner original packet, so that the next-hop transit node performs routing and forwarding based on the outer IPv6 header.

Case B2: The outer IPv6 header is a header carried in the original packet.

For example, when the original packet is an IPv6 packet, the outer IPv6 header in the IPv6 packet received by the second network device may not be added by the first network device, but is carried in the original packet. In this case, the second network device does not remove the IPv6 header, but transfers the IPv6 header carried in the original packet to the next-hop node.

Optionally, case B2 is applied to a case in which the second network device is a tail node. The tail node does not remove the IPv6 header, but removes the IPv6 extension header and sends the removed packet to a customer edge (CE) node, so that the packet received by the CE node retains the IPv6 header of the original packet and does not include the IPv6 extension header added in a routing and forwarding process. Certainly, case B2 may also be applied to a case in which the second network device is a transit node.

Case C: The second network device does not remove the IPv6 extension header, and sends the outer IPv6 header, the IPv6 extension header, and the inner original packet. Case C is applicable to a scenario in which the second network device is a transit node. For example, the IPv6 extension header (such as the hop-by-hop options header) carries not only the EPG information required for executing the group based policy, but also information such as a fragment identifier of a network fragment, a required delay, and a required bandwidth required by other forwarding planes. After executing the group based policy based on the EPG information in the IPv6 extension header, the transit node forwards the IPv6 packet including the IPv6 header, the IPv6 extension header, and the original packet to the next-hop transit node, so that the next-hop transit node can use the information in the IPv6 extension header.

Optionally, the IPv6 packet is an SRv6-BE packet, and the destination IP address in the outer IPv6 header of the IPv6 packet is a VPN SID. The following uses manner 1, manner 2, and manner 3 as examples to describe how the second network device forwards a packet in an SRv6-BE scenario.

Manner 1 describes how the destination VTEP device forwards a packet when SRv6-BE is used, manner 2 describes how a transit node not supporting SRv6 forwards a packet when SRv6-BE is used, and manner 3 describes how a transit node supporting SRv6 forwards a packet when SRv6-BE is used.

Manner 1: The second network device queries a local SID table based on the destination IP address in the outer IPv6 header, and if determining that the destination address matches a VPN SID in the local SID table, the second network device removes the IPv6 header and the IPv6 extension header, and sends the original packet to the VPN instance (for example, the second computing device or a CE device connected to the second computing device). In this way, the original packet is finally forwarded to the second computing device. For example, if the second network device determines, based on the local SID table, that the type of the destination IP address is End.DX, the second network device sends the original packet through an outbound interface bound to the End.DX SID. For another example, if the second network device determines, based on the local SID table, that the type of the destination IP address is End.DT, the second network device queries a VPN instance routing table based on the destination address in the original packet and forwards the original packet.

Manner 2: The second network device queries an IPv6 routing and forwarding table based on the destination IP address in the outer IPv6 header, and performs longest prefix matching and forwarding on the IPv6 packet based on the IPv6 routing and forwarding table. In this way, the IPv6 packet is forwarded to the destination VTEP device.

Manner 3: The second network device first queries a local SID table based on the destination IP address in the outer IPv6 header, and if determining that the destination address matches none of SIDs in the local SID table, the second network device queries an IPv6 routing and forwarding table, and performs longest prefix matching and forwarding on the IPv6 packet based on the IPv6 routing and forwarding table. In this way, the IPv6 packet is forwarded to the destination VTEP device.

Optionally, when the IPv6 packet includes an identifier field, the second network device first updates a value of the identifier field, and then forwards the IPv6 packet with the identifier field updated. For example, if the second network device is a transit node, the second network device not only executes the group based policy, but also sets the identifier field, and sends, to a downstream transit node, the IPv6 packet that is processed according to the group based policy and whose identifier field is set. In this optional manner, because the policy execution node updates the identifier field after executing the group based policy, it can indicate that the group based policy has been executed, so that the group based policy does not need to be repeatedly executed in a subsequent forwarding process of the IPv6 packet, thereby reducing processing overheads of a downstream node of the policy execution node.

This embodiment provides a method for implementing micro-segmentation in the IPv6 network. The IPv6 extension header of the IPv6 packet carries the EPG information, so that the EPG information is visible to a receive end of the IPv6 packet, and the receive end of the IPv6 packet can execute a group based policy based on the EPG information in the IPv6 extension header without decapsulating a VXLAN header, thereby implementing a micro-segmentation function and reducing processing complexity. Since the IPv6 extension header is more extensible, the problem that the VXLAN header carrying the EPG information is less extensible is resolved, and new functions can be obtained through further extension. In addition, because a packet encapsulation format is simpler, and a header occupies fewer bytes, overheads caused by packet transmission are reduced.

The foregoing method 200 describes an IPv6-based micro-segmentation method. The following separately describes the method 200 by using the method 300 and the method 400 as examples.

Figure 20:
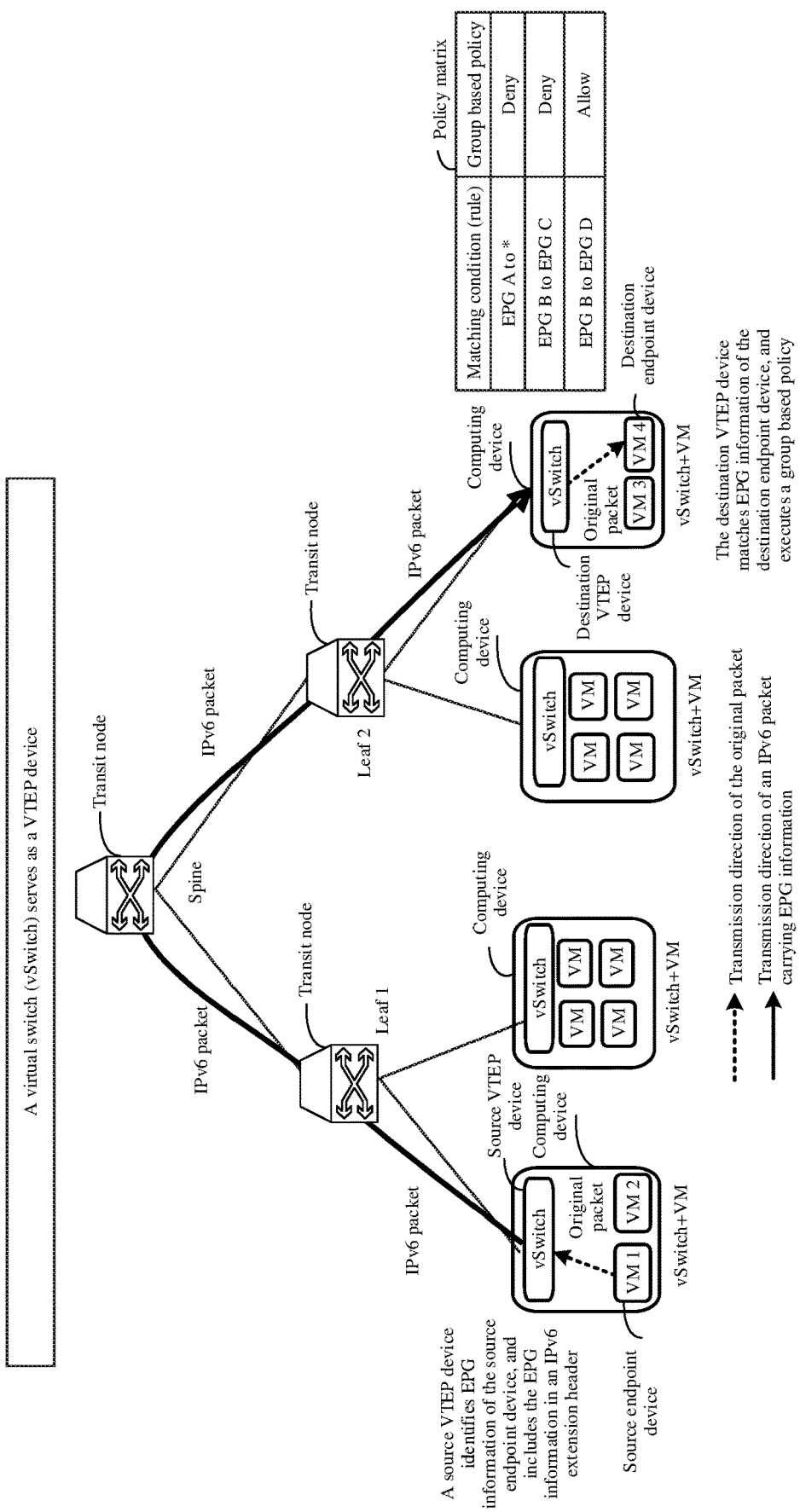
FIG. 20 is a schematic diagram of a scenario of implementing micro-segmentation according to an embodiment of this application.
Figure 21:
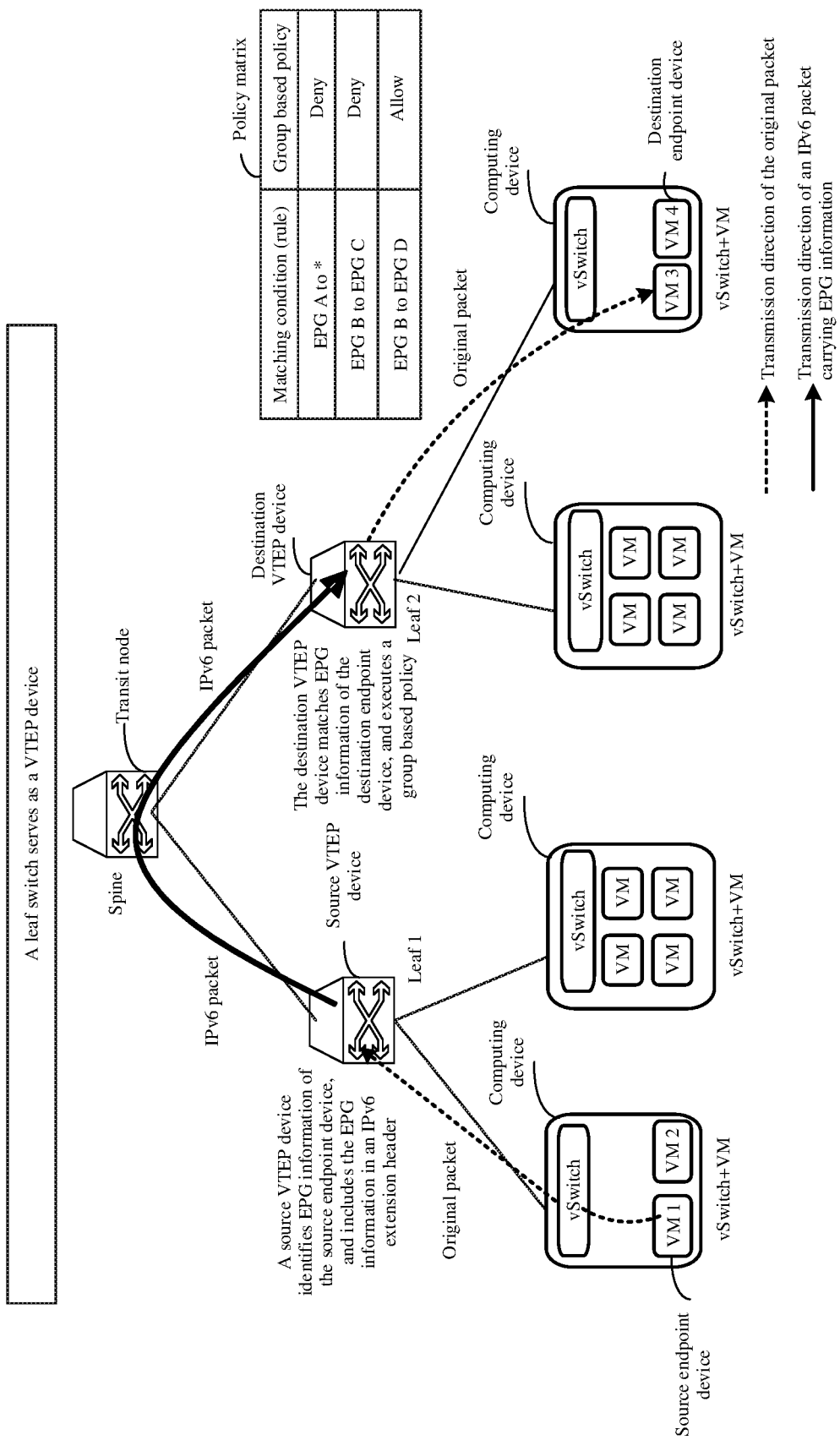
FIG. 21 is a schematic diagram of a scenario of implementing micro-segmentation according to an embodiment of this application.

Refer to FIG. 20 and FIG. 21. In the following method 300, a first computing device (a source endpoint device) is VM 1, a first network device is a source VTEP device, a second network device is a destination VTEP device, and a second computing device (a destination endpoint device) is VM 4. In other words, a method procedure described in the method 300 is about how the destination VTEP device executes a group based policy based on IPv6 in a process in which VM 1 accesses VM 4. For steps in the method 300 that are similar to the steps in the method F00, refer to the method F00. Details are not described in the method S00.

FIG. 20 shows a scenario in which a VTEP device is implemented by using a server. The VTEP device is a virtual switch in the server, and the virtual switch may be implemented by using a hypervisor or a network adapter. For example, the source VTEP device is virtual switch 1 in a server in which VM 1 is located. The destination VTEP device is virtual switch 2 in a server in which VM 4 is located.

FIG. 21 shows a scenario in which a VTEP device is implemented by using a network device. The VTEP device is a network device (for example, a data center TOR switch). For example, the source VTEP device is leaf 1. The destination VTEP device is leaf 2.

Figure 22:
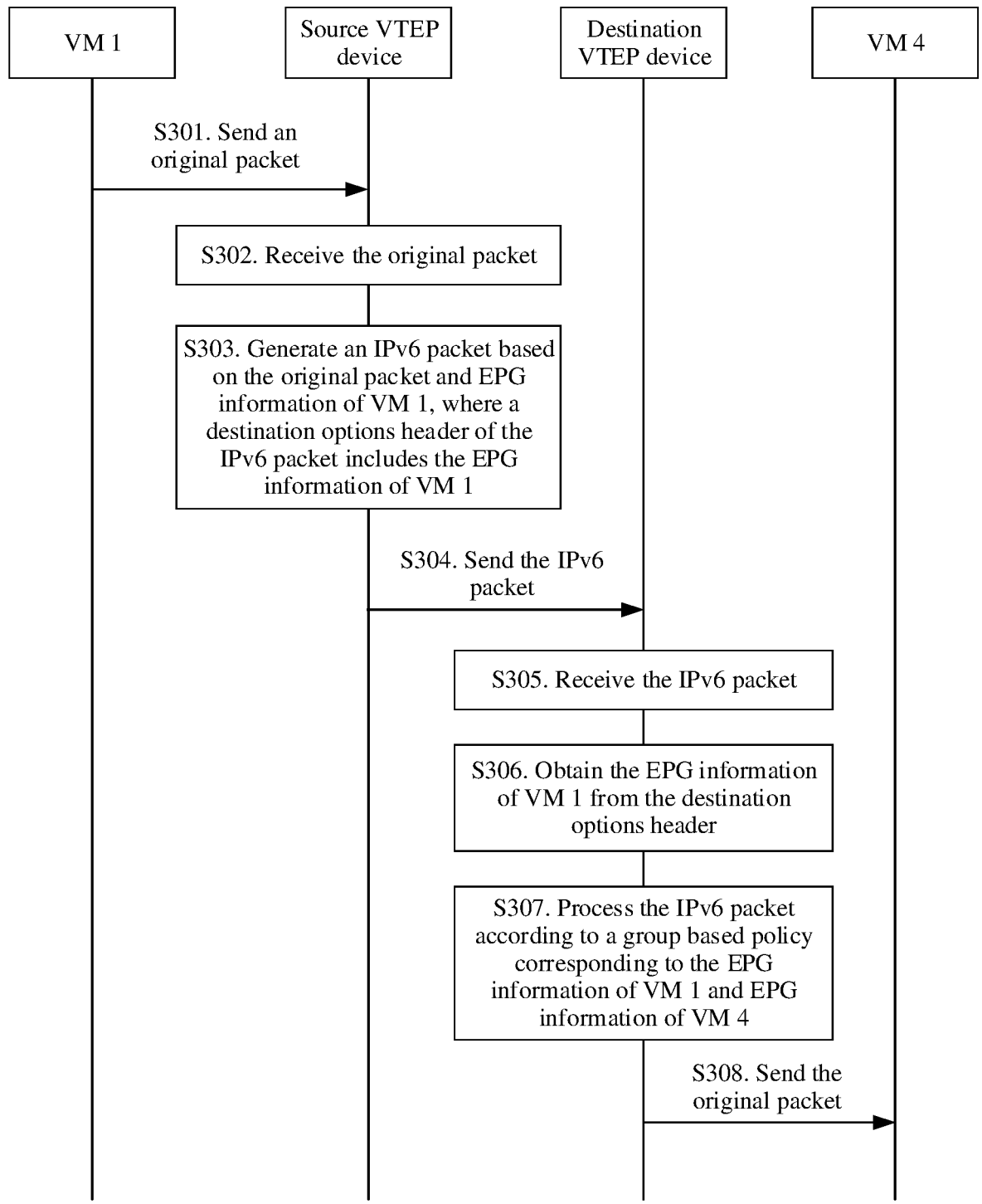
FIG. 22 is a flowchart of a packet processing method 300 according to an embodiment of this application.

Refer to FIG. 22. For example, the method 300 includes S301 to S308.

S301. VM 1 sends an original packet.

S302. The source VTEP device in an IPv6 network receives the original packet.

For example, refer to FIG. 20 or FIG. 21. A transmission direction of a packet flow is from VM 1 to VM 4. VM 1 sends the original packet, and the original packet reaches the source VTEP device. If the source VTEP device identifies, based on an IP address of the original packet, that an EPG to which VM 1 belongs is group B, and determines that the destination end VM 4 of the original packet is not connected to the source VTEP device, the source VTEP device performs S303.

S303. The source VTEP device generates an IPv6 packet based on the original packet and EPG information of VM 1, where a destination options header of the IPv6 packet includes the EPG information of VM 1.

The EPG information of VM 1 is described as an example of the first EPG information (the EPG information of the source endpoint device) in the method 200. The EPG information of VM 1 identifies the EPG to which VM 1 belongs. For example, if the EPG to which VM 1 belongs is EPG B, the EPG information of VM 1 is an ID of EPG B. The source VTEP device encapsulates the ID of EPG B into the destination options header, for example, into a TLV in the destination options header. The source VTEP device encapsulates the original packet into the destination options header and forwards the encapsulated packet to the destination VTEP device.

S304. The source VTEP device sends the IPv6 packet.

S305. The destination VTEP device in the IPv6 network receives the IPv6 packet.

S306. The destination VTEP device obtains the EPG information of VM 1 from the destination options header.

In the method 300, the destination VTEP device has two roles: a VTEP device and a group based policy execution node. After the packet reaches the destination VTEP, the destination VTEP device reads the EPG information of VM 1 from the TLV in the destination options header and caches the EPG information of VM 1.

S307. The destination VTEP device processes the IPv6 packet according to a group based policy corresponding to the EPG information of VM 1 and EPG information of VM 4.

The EPG information of VM 4 is described as an example of the second EPG information (the EPG information of the destination endpoint device) in the method 200. The EPG information of VM 4 identifies an EPG to which VM 4 belongs. Specifically, the destination VTEP device performs outer IPv6 decapsulation to expose the original packet, and the destination VTEP device matches the EPG information of VM 4 based on a destination IP address in the original packet. The destination VTEP device searches a policy matrix based on the EPG information of VM 1 and the EPG information of VM 4 to obtain a corresponding group based policy. The destination VTEP device processes the original packet according to the group based policy.

S308. The destination VTEP device sends the original packet to VM 4.

This embodiment provides a method for the destination VTEP device to execute the group based policy based on the IPv6 network. The IPv6 destination options header carries the EPG information of the source endpoint device, so that the EPG information of the source endpoint device is transferred to the destination VTEP device by using the destination options header. Therefore, the destination VTEP device can execute the group based policy based on the EPG information of the source endpoint device without decapsulating a VXLAN header. This implements a micro-segmentation function and reduces processing complexity. Since the destination options header is more extensible, the problem that the VXLAN header carrying the EPG information is less extensible is resolved, and new functions can be obtained through further extension. In addition, because an encapsulation format of the destination options header is simpler, and outer encapsulation overheads of a packet are fewer, overheads caused by packet transmission are reduced.

Figure 23:
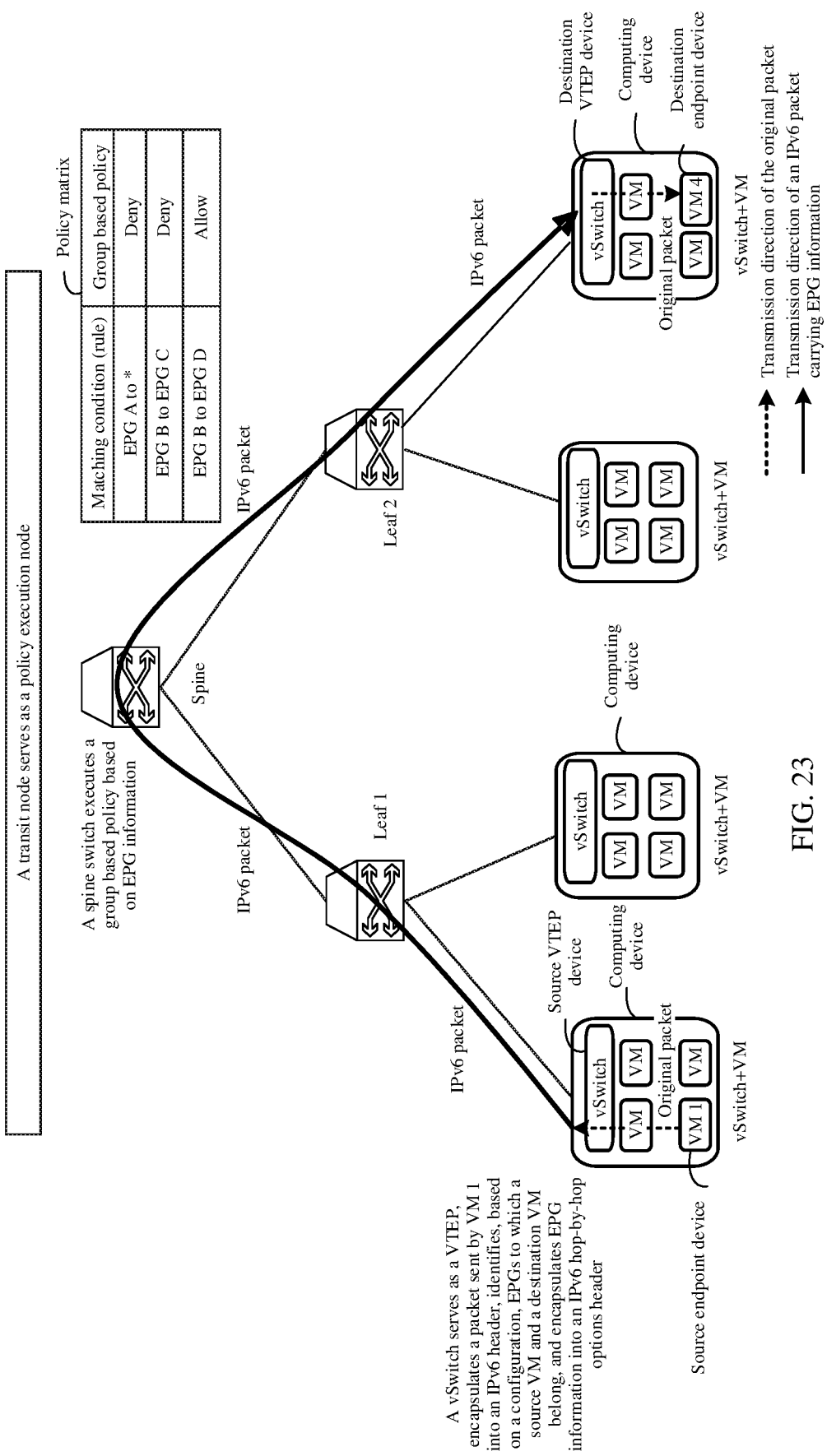
FIG. 23 is a schematic diagram of a scenario of implementing micro-segmentation according to an embodiment of this application.

Refer to FIG. 23. In the following method 400, a first computing device is VM 1, a first network device is a source VTEP device, a second network device is a transit node, and a second computing device is VM 4. In other words, a method procedure described in the method 400 is about how the transit node executes a group based policy based on IPv6 in a process in which VM 1 accesses VM 4. For steps in the method 400 that are similar to the steps in the method 200 or the method 300, refer to the method 200 or the method 300. Details are not described in the method 400.

Figure 24:
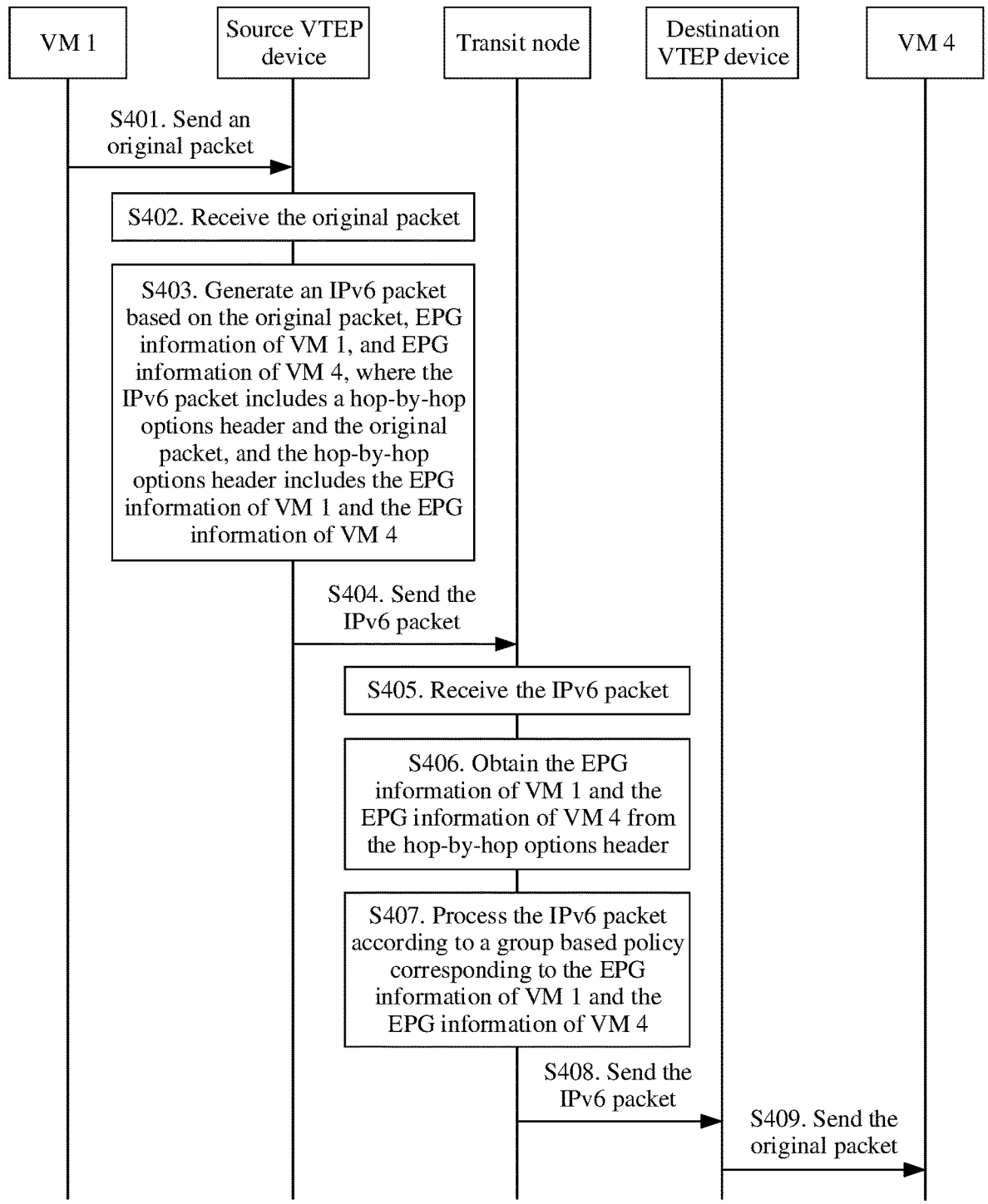
FIG. 24 is a flowchart of a packet processing method 400 according to an embodiment of this application.

Refer to FIG. 24. For example, the method 400 includes S401 to S409.

S401. VM 1 sends an original packet.

S402. The source VTEP device in an IPv6 network receives the original packet.

S403. The source VTEP device generates an IPv6 packet based on the original packet, EPG information of VM 1, and EPG information of VM 4, where the IPv6 packet includes a hop-by-hop options header and the original packet, and the hop-by-hop options header includes the EPG information of VM 1 and the EPG information of VM 4.

The EPG information of VM 1 is described as an example of the first EPG information (the EPG information of the source endpoint device) in the method 200. The EPG information of VM 4 is described as an example of the second EPG information (the EPG information of the destination endpoint device) in the method 200. Specifically, in the method 400, a vSwitch on a data center server serves as a VTEP device. The VTEP device searches for the EPG information of VM 1 and the EPG information of VM 4 based on a source IP address, a destination IP address, and local entry information of an inner original packet, encapsulates the EPG information of VM 1 and the EPG information of VM 4 into an IPv6 hop-by-hop options header, and forwards the IPv6 packet encapsulated with the hop-by-hop options header.

S404. The source VTEP device sends the IPv6 packet.

S405. A transit node in the IPv6 network receives the IPv6 packet.

S406. The transit node obtains the EPG information of VM 1 and the EPG information of VM 4 from the hop-by-hop options header.

S407. The transit node processes the IPv6 packet according to a group based policy corresponding to the EPG information of VM 1 and the EPG information of VM 4.

Because the hop-by-hop options header carries the EPG information of the source endpoint device and the EPG information of the destination endpoint device, a transit node at any hop on a forwarding path may execute the group based policy based on the EPG information of the source endpoint device and the EPG information of the destination endpoint device. The transit node is, for example, a data center leaf switch or a spine switch. For example, FIG. 23 shows how to execute a group based policy on a spine switch. When the group based policy is Forward or Remark, the transit node performs S408 below. When the group based policy is Discard, the transit node ends the procedure.

S408. The transit node sends the IPv6 packet.

S409. The destination VTEP device receives the IPv6 packet, decapsulates the IPv6 packet to obtain the original packet, and sends the original packet to VM 4.

This embodiment provides a method for the transit node to execute the group based policy based on the IPv6 network. The IPv6 hop-by-hop options header carries the EPG information of the source endpoint device and the EPG information of the destination endpoint device, so that the EPG information of the source endpoint device and the EPG information of the destination endpoint device are transferred to the transit node by using the hop-by-hop options header. Therefore, the transit node can execute the group based policy based on the EPG information of the source endpoint device and the EPG information of the destination endpoint device without decapsulating a VXLAN header. This implements a micro-segmentation function and reduces processing complexity. Since the hop-by-hop options header is more extensible, the problem that the VXLAN header carrying the EPG information is less extensible is resolved, and new functions can be obtained through further extension. In an aspect, because an encapsulation format of the hop-by-hop options header is simpler, and outer encapsulation overheads of a packet are fewer, overheads caused by packet transmission are reduced. In another aspect, a restriction that only the VTEP device can execute the group based policy is broken, and the roles of a policy execution node and a VTEP device are decoupled, so that the transit node can also execute the group based policy, thereby supporting the micro-segmentation function. In another aspect, the transit node does not need to perform outer decapsulation when executing the group based policy. Therefore, processing overheads of the outer decapsulation are avoided, and the processing procedure is simplified.

The foregoing describes the method 200, the method 300, and the method 400 in embodiments of this application. The following describes a network device in embodiments of this application. The network device described below has any function of the first network device or the second network device in the foregoing method 200, method 300, or method 400.

Figure 25:
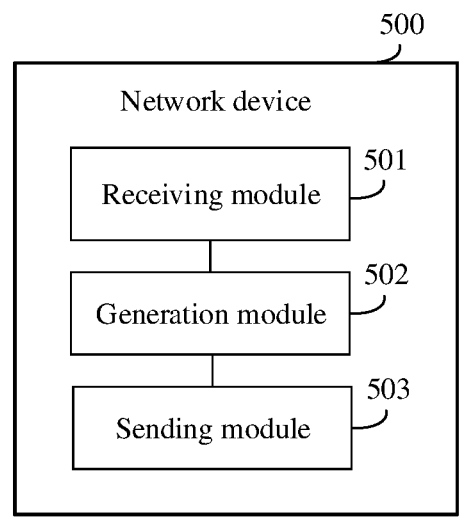
FIG. 25 is a schematic structural diagram of a network device 500 according to an embodiment of this application.

FIG. 25 is a schematic structural diagram of a network device 500 according to an embodiment of this application. As shown in FIG. 25, the network device 500 includes: a receiving module 501, configured to perform S202, S302, or S402, a generation module 502, configured to perform S203, S303, or S403, and a sending module 503, configured to perform S204, S304, or S404.

The network device 500 corresponds to the first network device in the foregoing method embodiments, and the modules in the network device 500 and the foregoing other operations and/or functions are separately used to implement various steps and methods implemented by the first network device in the foregoing method embodiments. For specific details, refer to the method 200, the method 300, or the method 400. For brevity, details are not described herein again.

When the network device 500 processes a packet, division of the foregoing functional modules is merely used as an example for description. In actual application, the foregoing functions may be allocated to different functional modules for implementation according to a requirement. That is, an internal structure of the network device 500 is divided into different functional modules, to implement all or some of the functions described above. In addition, the network device 500 provided in the foregoing embodiment belongs to a same concept as the method 200, the method 300, or the method 400. For a specific implementation process of the network device 500, refer to the method 200, the method 300, or the method 400. Details are not described herein again.

Figure 26:
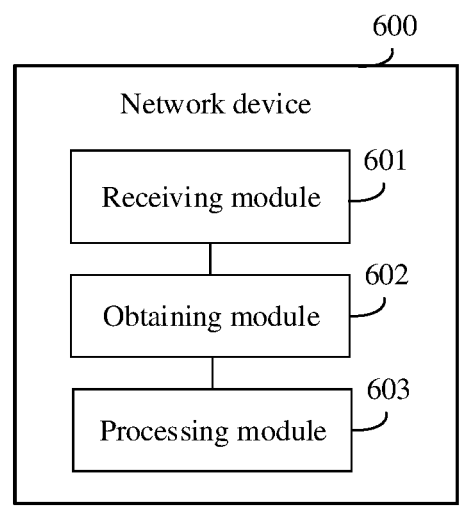
FIG. 26 is a schematic structural diagram of a network device 600 according to an embodiment of this application.

FIG. 26 is a schematic structural diagram of a network device 600 according to an embodiment of this application. As shown in FIG. 26, the network device 600 includes: a receiving module 601, configured to perform S205, S305, or S405, an obtaining module 602, configured to perform S206, S306, or S406, and a processing module 603, configured to perform S207, S307, or S407.

The network device 600 corresponds to the second network device in the foregoing method embodiments, and the modules in the network device 600 and the foregoing other operations and/or functions are separately used to implement various steps and methods implemented by the second network device in the foregoing method embodiments. For specific details, refer to the method 200, the method 300, or the method 400. For brevity, details are not described herein again.

When the network device 600 processes a packet, division of the foregoing functional modules is merely used as an example for description. In actual application, the foregoing functions may be allocated to different functional modules for implementation according to a requirement. That is, an internal structure of the network device 600 is divided into different functional modules, to implement all or some of the functions described above. In addition, the network device 600 provided in the foregoing embodiment belongs to a same concept as the method 200, the method 300, or the method 400. For a specific implementation process of the network device 600, refer to the method 200, the method 300, or the method 400. Details are not described herein again.

Corresponding to the method embodiment and the virtual apparatus embodiment provided in this application, an embodiment of this application further provides a network device. The following describes a hardware structure of the network device.

A network device 700 or a network device 800 described below corresponds to the first network device or the second network device in the foregoing method embodiments. Hardware or modules in the network device 700 or the network device 800, and the foregoing other operations and/or functions are separately used to implement various steps and methods implemented by the network device 700 or the network device 800 in the method embodiments. For specific details about how the network device 700 or the network device 800 implements micro-segmentation based on IPv6, refer to the foregoing method embodiments. For brevity, details are not described herein again. The steps of the method 200, the method 300, or the method 400 are implemented by using an integrated logical circuit of hardware in the processor of the network device 700 or the network device 800, or by using instructions in a form of software. The steps of the methods disclosed with reference to embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

The network device 700 or the network device 800 corresponds to the network device 500 or the network device 600 in the foregoing virtual apparatus embodiment. Each function module in the network device 500 or the network device 600 is implemented by using software of the network device 700 or the network device 800. In other words, the function module included in the network device 500 or the network device 600 is generated after the processor of the network device 700 or the network device 800 reads the program code stored in the memory.

Figure 27:
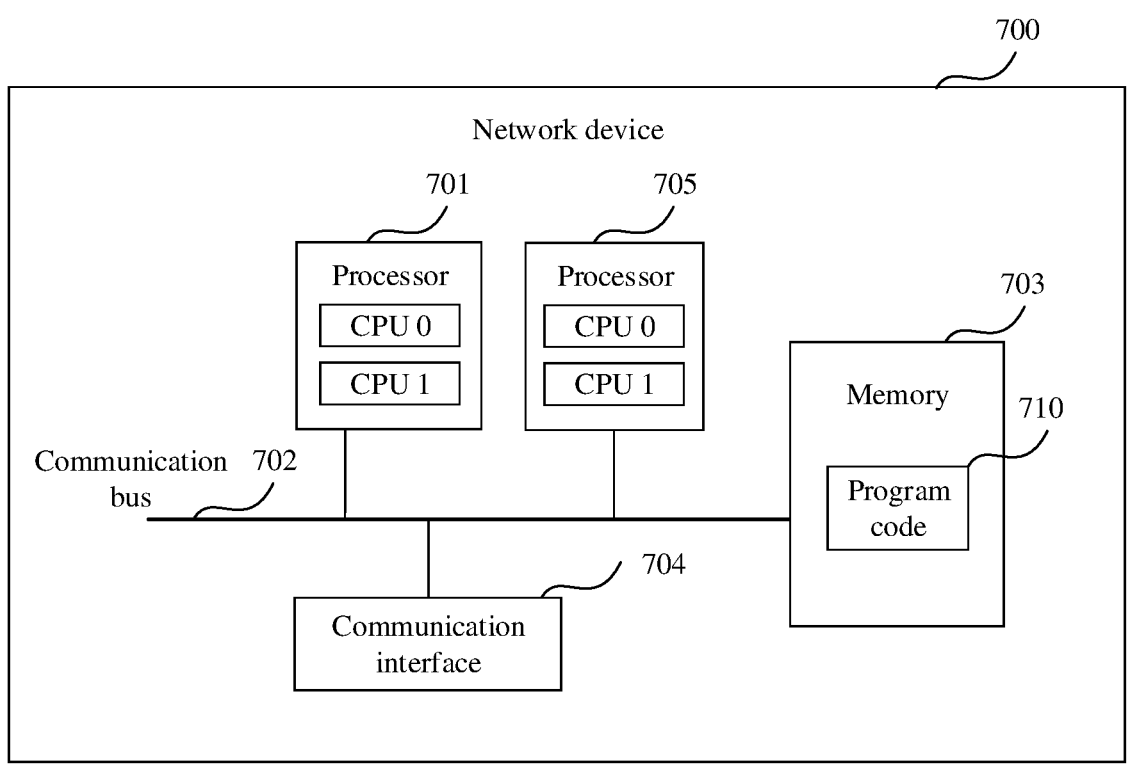
FIG. 27 is a schematic structural diagram of a network device 700 according to an embodiment of this application.

FIG. 27 is a schematic structural diagram of a network device 700 according to an example embodiment of this application. The network device 700 may be configured as a first network device or a second network device. The network device 700 may be implemented by using a general bus architecture.

The network device 700 includes at least one processor 701, a communication bus 702, a memory 703, and at least one communication interface 704.

The processor 701 may be a general-purpose CPU, an NP, a microprocessor, or may be one or more integrated circuits configured to implement the solutions of this application, for example, an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The communication bus 702 is configured to transmit information between the foregoing components. The communication bus 702 may be classified into an address bus, a data bus, a control bus, and the like. For ease of representation, only one thick line is used to represent the bus in FIG. 27, but this does not mean that there is only one bus or only one type of bus.

The memory 703 may be a read-only memory (ROM) or another type of static storage device capable of storing static information and instructions, or may be a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile optical disc, a blu-ray optical disc, or the like), a magnetic disk storage medium or another magnetic storage device, or any other medium capable of carrying or storing expected program code in a form of instructions or a data structure and capable of being accessed by a computer. The memory 703 is not limited thereto. The memory 703 may exist independently, and is connected to the processor 701 by using the communication bus 702. Alternatively, the memory 703 may be integrated with the processor 701.

The communication interface 704 is configured to communicate with another device or a communication network by using any transceiver-type apparatus. The communication interface 704 includes a wired communication interface, and may further include a wireless communication interface. The wired communication interface may be, for example, an Ethernet interface. The Ethernet interface may be an optical interface, an electrical interface, or a combination thereof. The wireless communication interface may be a wireless local area network (WLAN) interface, a cellular network communication interface, a combination thereof, or the like.

In a specific implementation, in an embodiment, the processor 701 may include one or more CPUs, such as a CPU 0 and a CPU 1 in FIG. 27.

In a specific implementation, in an embodiment, the network device 700 may include a plurality of processors such as a processor 701 and a processor 705 shown in FIG. 27. Each of the processors may be a single-core processor (single-CPU) or may be a multi-core processor (multi-CPU). The processor herein may refer to one or more devices, circuits, and/or processing cores configured to process data (for example, computer program instructions).

In a specific implementation, in an embodiment, the network device 700 may further include an output device 706 and an input device 707. The output device 706 communicates with the processor 701, and may display information in a plurality of manners. For example, the output device 706 may be a liquid crystal display (LCD), a light emitting diode (LED) display device, a cathode ray tube (CRT) display device, or a projector. The input device 707 communicates with the processor 701, and may receive an input from a user in a plurality of manners. For example, the input device 707 may be a mouse, a keyboard, a touchscreen device, a sensing device, or the like.

In some embodiments, the memory 703 is configured to store program code 710 for performing the solutions of this application, and the processor 701 may execute the program code 710 stored in the memory 703. In other words, the network device 700 may implement, by using the processor 701 and the program code 710 in the memory 703, the method 200, the method 300, or the method 400 provided in the method embodiments.

The network device 700 in this embodiment of this application may correspond to the first network device or the second network device in the foregoing method embodiments. In addition, the processor 701, the communication interface 704, and the like in the network device 700 may implement functions of the first network device or the second network device and/or steps and methods implemented by the first network device or the second network device in the foregoing method embodiments. For brevity, details are not described herein again.

The receiving module 501 and the sending module 503 in the network device 500 are equivalent to the communication interface 704 in the network device 700. The generation module 502 in the network device 500 may be equivalent to the processor 701 in the network device 700.

The receiving module 601 in the network device 600 is equivalent to the communication interface 704 in the network device 700. The obtaining module 602 and the processing module 603 in the network device 600 may be equivalent to the processor 701 in the network device 700.

Figure 28:
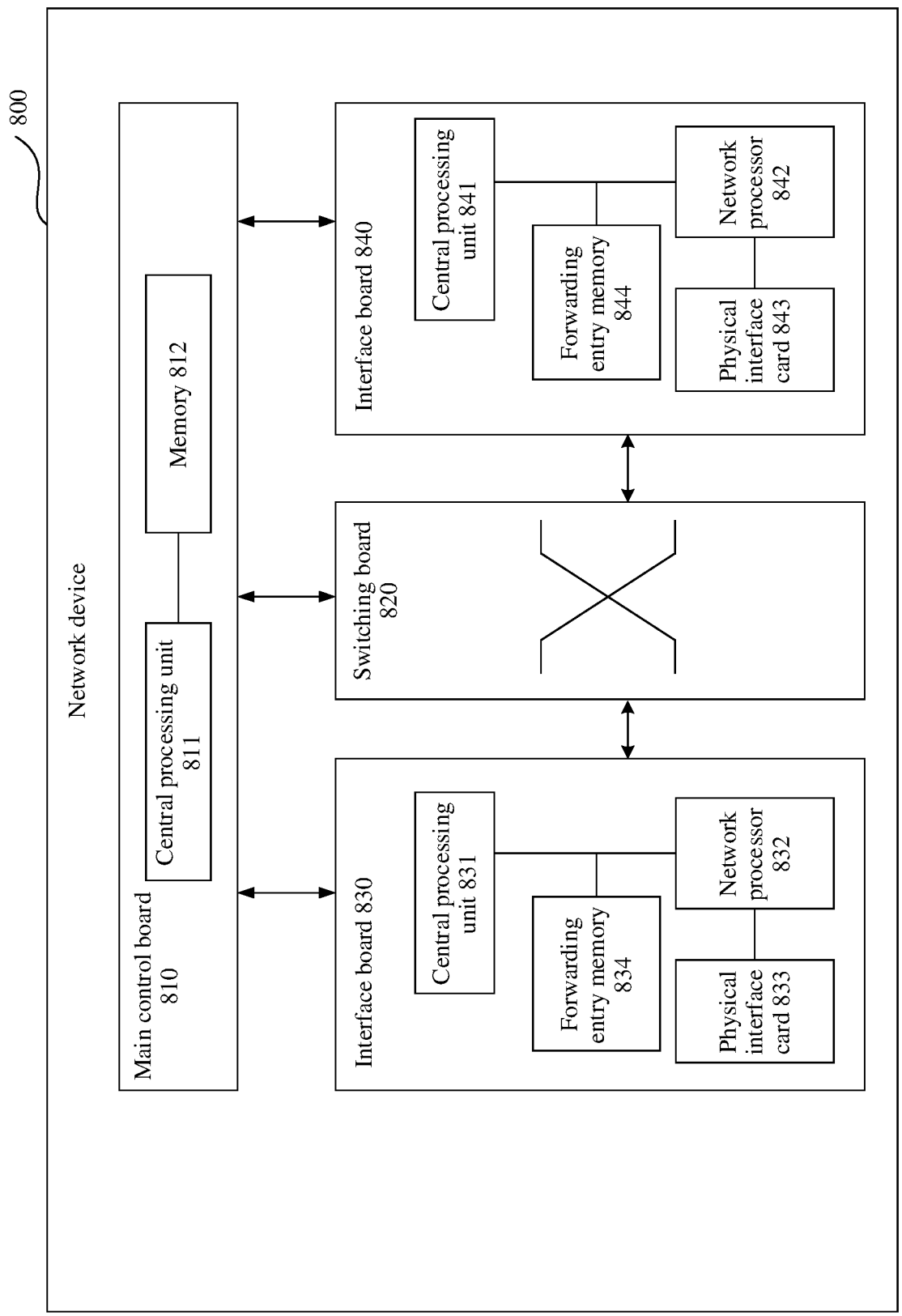
FIG. 28 is a schematic structural diagram of a network device 800 according to an embodiment of this application.

FIG. 28 is a schematic structural diagram of a network device 800 according to an example embodiment of this application. The network device 800 may be configured as a first network device or a second network device. The network device 800 includes a main control board 810 and an interface board 830.

The main control board 810 is also referred to as a main processing unit (MPU) or a route process card (route processor card). The main control board 810 is configured to control and manage components in the network device 800, including routing calculation, device management, device maintenance, and protocol processing. The main control board 810 includes a central processing unit 811 and a memory 812.

The interface board 830 is also referred to as a line processing unit (LPU), a line card, or a service board. The interface board 830 is configured to: provide various service interfaces, and forward a data packet. The service interfaces include but are not limited to an Ethernet interface, a POS (Packet over SONET/SDH) interface, and the like. The Ethernet interface is, for example, a flexible Ethernet service interface (Flexible Ethernet Client, FlexE Client). The interface board 830 includes a central processing unit 831, a network processor 832, a forwarding entry memory 834, and a physical interface card (physical interface card, PIC) 833.

The central processing unit 831 on the interface board 830 is configured to: control and manage the interface board 830, and communicate with the central processing unit 811 on the main control board 810.

The network processor 832 is configured to forward a packet. A form of the network processor 832 may be a forwarding chip. Specifically, the network processor 832 is configured to forward a received packet based on a forwarding table stored in the forwarding entry memory 834. If a destination address of the packet is an address of the network device 800, the network processor 832 sends the packet to a CPU (for example, the central processing unit 811) for processing. If the destination address of the packet is not the address of the network device 800, the network processor 832 searches for, based on the destination address, a next hop and an outbound interface corresponding to the destination address in the forwarding table, and forwards the packet to the outbound interface corresponding to the destination address. An uplink packet is processed as follows:

An inbound interface of the packet is processed, and the forwarding table is searched. A downlink packet is processed as follows: The forwarding table is searched.

The physical interface card 833 is configured to implement a physical layer interconnection function. Original traffic enters the interface board 830 from the physical interface card 833, and a processed packet is sent out from the physical interface card 833. The physical interface card 833, also referred to as a subcard, may be mounted on the interface board 830, and is responsible for converting an optical/electrical signal into a packet, performing validity check on the packet, and forwarding the packet to the network processor 832 for processing. In some embodiments, the central processing unit may also perform a function of the network processor 832, for example, implement software forwarding based on a general-purpose CPU. Therefore, the network processor 832 is not required in the physical interface card 833.

Optionally, the network device 800 includes a plurality of interface boards. For example, the network device 800 further includes an interface board 840, and the interface board 840 includes a central processing unit 841, a network processor 842, a forwarding entry memory 844, and a physical interface card 843.

Optionally, the network device 800 further includes a switching board 820. The switching board 820 may also be referred to as a switch fabric unit (SFU). When the network device has a plurality of interface boards 830, the switching board 820 is configured to complete data exchange between the interface boards. For example, the interface board 830 and the interface board 840 may communicate with each other via the switching board 820.

The main control board 810 is coupled to the interface board 830. For example, the main control board 810, the interface board 830, the interface board 840, and the switching board 820 are connected to a system backplane by using a system bus to implement interworking. In a possible implementation, an inter-process communication (IPC) channel is established between the main control board 810 and the interface board 830, and the main control board 810 communicates with the interface board 830 through the IPC channel.

Logically, the network device 800 includes a control plane and a forwarding plane. The control plane includes the main control board 810 and the central processing unit 831. The forwarding plane includes components that perform forwarding, such as the forwarding entry memory 834, the physical interface card 833, and the network processor 832. The control plane performs functions such as routing, generating a forwarding table, processing signaling and a protocol packet, and configuring and maintaining a device status. The control plane delivers the generated forwarding table to the forwarding plane. At the forwarding plane, by performing table lookup based on the forwarding table delivered by the control plane, the network processor 832 forwards a packet received by the physical interface card 833. The forwarding table delivered by the control plane may be stored in the forwarding entry memory 834. In some embodiments, the control plane and the forwarding plane may be totally separated, and are not on a same device.

If the network device 800 is configured as the first network device, the physical interface card 833 receives an original packet, and sends the original packet to the network processor 832. The network processor 832 generates an IPv6 packet based on the original packet and EPG information, and sends, based on information about an outbound interface, the IPv6 packet through the physical interface card 833 after completing link layer encapsulation. In this way, the IPv6 packet is transmitted to the second network device.

If the network device 800 is configured as the second network device, the physical interface card 833 receives an IPv6 packet, and sends the IPv6 packet to the network processor 832. The network processor 832 obtains EPG information from an IPv6 extension header, and processes the IPv6 packet according to a group based policy corresponding to the EPG information.

The receiving module 501 and the sending module 503 in the network device 500 are equivalent to the physical interface card 833 in the network device 800. The generation module 502 in the network device 500 may be equivalent to the network processor 832 or the central processing unit 811.

The receiving module 601 in the network device 600 is equivalent to the physical interface card 833 in the network device 800. The obtaining module 602 and the processing module 603 in the network device 600 may be equivalent to the network processor 832 or the central processing unit 811.

Operations performed on the interface board 840 are consistent with the operations performed on the interface board 830 in this embodiment of this application. For brevity, details are not described. The network device 800 in this embodiment may correspond to the first network device or the second network device in the foregoing method embodiments. The main control board 810, and the interface board 830 and/or the interface board 840 in the network device 800 may implement the functions of the first network device or the second network device in the foregoing method embodiments and/or the steps implemented by the first network device or the second network device in the foregoing method embodiments. For brevity, details are not described herein again.

It should be noted that, when there are a plurality of main control boards, the plurality of main control boards may include a primary main control board and a secondary main control board. There may be one or more interface boards; and a network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the network device may not need the switching board, and the interface board provides a function of processing service data in an entire system. In a distributed forwarding architecture, the network device may have at least one switching board, and data exchange between a plurality of interface boards is implemented by using the switching board, to provide a large-capacity data exchange and processing capability. Therefore, a data access and processing capability of the network device in the distributed architecture is better than that of the device in the centralized architecture. Optionally, the network device may alternatively be in a form in which there is only one card. To be specific, there is no switching board, and functions of the interface board and the main control board are integrated on the card. In this case, the central processing unit on the interface board and the central processing unit on the main control board may be combined to form one central processing unit on the card, to perform functions obtained by combining the two central processing units. This form of device (for example, a network device such as a low-end switch or a router) has a weak data exchange and processing capability. A specific architecture that is to be used depends on a specific networking deployment scenario. This is not limited herein.

In some possible embodiments, the first network device or the second network device may be implemented as a virtualized device.

For example, the virtualized device may be a virtual machine (VM) on which a program having a packet sending function is run, and the virtual machine is deployed on a hardware device (for example, a physical server). The virtual machine is a complete software-simulated computer system that has complete hardware system functions and that runs in an entirely isolated environment. The virtual machine may be configured as the first network device or the second network device. For example, the first network device or the second network device may be implemented based on a general-purpose physical server in combination with a network functions virtualization (NFV) technology. The first network device or the second network device is a virtual host, a virtual router, or a virtual switch. After reading this application, with reference to the NFV technology, a person skilled in the art may virtualize, on the general-purpose physical server, the first network device or the second network device having the foregoing functions. Details are not described herein.

For example, the virtualized device may be a container, and the container is an entity configured to provide an isolated virtualized environment. For example, the container may be a docker container. The container may be configured as the first network device or the second network device. For example, the first network device or the second network device may be created by using a corresponding image. For example, two container instances, namely, container instance proxy-container 1 and container instance proxy-container 2, may be created for a proxy-container (a container that provides a proxy service) by using an image of the proxy-container. The container instance proxy-container 1 is provided as the first network device or a first computing device. The container instance proxy-container 2 is provided as the second network device or a second computing device. When the container technology is used for implementation, the first network device or the second network device may run by using a kernel of a physical machine, and a plurality of first network devices or second network devices may share an operating system of the physical machine. Different first network devices or second network devices may be isolated by using the container technology. The containerized first network device or second network device may run in a virtualized environment, for example, may run in a virtual machine. Alternatively, the containerized first network device or second network device may directly run in a physical machine.

For example, the virtualized device may be a pod. The pod is a basic unit of Kubernetes (Kubernetes is an open-source container orchestration engine of Google, and is briefly referred to as K8s in English) for deploying, managing, and orchestrating a containerized application. The pod may include one or more containers. All containers in a same pod are usually deployed on a same host. Therefore, all the containers in the same pod may communicate with each other through the host, and may share storage resources and network resources of the host. The pod may be configured as the first network device or the second network device. For example, specifically, a container as a service (CaaS) may be instructed to create a pod, and the pod is provided as the first network device or the second network device.

Certainly, the first network device or the second network device may alternatively be another virtualized device, which is not listed one by one herein.

In some possible embodiments, the first network device or the second network device may alternatively be implemented by a general-purpose processor. For example, the general-purpose processor may be in a form of a chip. Specifically, the general-purpose processor implementing the first network device or the second network device includes a processing circuit, and an inbound interface and an outbound interface that are internally connected to and communicated with the processing circuit. The processing circuit is configured to perform the packet generation step in the foregoing method embodiments by using the inbound interface. The processing circuit is configured to perform the receiving step in the foregoing method embodiments by using the inbound interface. The processing circuit is configured to perform the sending step in the foregoing method embodiments by using the outbound interface. Optionally, the general-purpose processor may further include a storage medium. The processing circuit is configured to perform the storage step in the foregoing method embodiments through the storage medium. The storage medium may store instructions executed by the processing circuit. The processing circuit is configured to execute the instructions stored in the storage medium, to perform the foregoing method embodiments.

Figure 29:
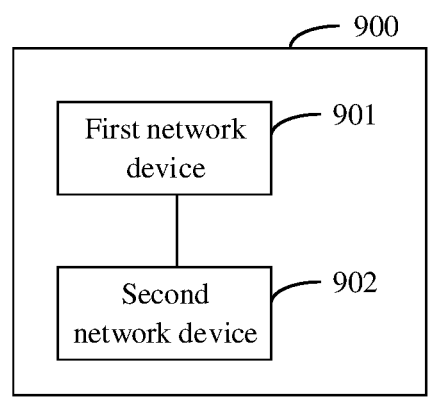
FIG. 29 is a schematic structural diagram of a network system 900 according to an embodiment of this application.

Referring to FIG. 29, an embodiment of this application provides a network system 900. The system 900 includes a first network device 901 and a second network device 902. Optionally, the first network device 901 is the network device 500, the network device 700, or the network device 800, and the second network device 902 is the network device 600, the network device 700, or the network device 800.

An embodiment of this application provides a computer program product. When the computer program product runs on a first network device or a second network device, the first network device or the second network device is enabled to perform the method 200, the method 300, or the method 400 in the foregoing method embodiment.

An embodiment of this application provides a chip. When the chip runs on a first network device or a second network device, the first network device or the second network device is enabled to perform the method 200, the method 300, or the method 400 in the foregoing method embodiment.

The network devices in the foregoing product forms separately have any function of the first network device or the second network device in the foregoing method embodiments, and details are not described herein.

A person of ordinary skill in the art may be aware that method steps and units described with reference to the embodiments disclosed in this specification may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatus, and unit, refer to a corresponding process in the foregoing method embodiments. Details are not described herein again.

In the several embodiments provided in this application, the disclosed systems, apparatuses and methods may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces, and indirect couplings or communication connections between the apparatuses or units may be electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions in the embodiments of this application.

In addition, function units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for indicating a computer device (which may be a personal computer, a server, a network device, or the like) to perform all or some of the steps of the method described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer program instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer program instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive), or the like.

A person of ordinary skill in the art may understand that all or some of the steps of embodiments may be implemented by hardware or a program instructing related hardware. The program may be stored in a computer-readable storage medium. The storage medium may include: a read-only memory, a magnetic disk, or an optical disc.

The foregoing descriptions are merely optional embodiments of this application, but are not intended to limit this application. Any modification, equivalent replacement, or improvement made without departing from the spirit and principle of this application shall fall within the protection scope of this application.

What is claimed is:

1. A first network device, applied to an Internet Protocol version 6 (IPv6) network, the first network device comprising:
   at least one processor; and
   a non-transitory computer readable storage medium storing a program that is executable by the at least one processor, the program including instructions to:
   receive an original packet;
   generate an IPv6 packet based on the original packet and endpoint group (EPG) information, wherein the IPv6 packet comprises an IPv6 extension header and the original packet, and the IPv6 extension header comprises the EPG information; and
   send the IPv6 packet.

2. The device according to claim 1, wherein the EPG information comprises at least one of first EPG information or second EPG information, the first EPG information identifies an EPG to which a first computing device belongs, a source Internet Protocol (IP) address of the original packet comprises an IP address of the first computing device, the second EPG information identifies an EPG to which a second computing device belongs, and a destination IP address of the original packet comprises an IP address of the second computing device.

3. The device according to claim 1, wherein the IPv6 extension header comprises at least one of a hop-by-hop options header or a destination options header, and at least one of the hop-by-hop options header or the destination options header comprises the EPG information.

4. The device according to claim 1, wherein the IPv6 extension header comprises a type length value (TLV), and the EPG information is located in a value field of the TLV.

5. The device according to claim 1, wherein the IPv6 extension header comprises one or more options, and the EPG information comprises first EPG information and second EPG information; and wherein the first EPG information and the second EPG information are located in a same option of the IPv6 extension header.

6. The device according to claim 1, wherein the IPv6 packet comprises an outer IPv6 header of the original packet, and a destination internet protocol (IP) address of the IPv6 header comprises a virtual private network segment identifier (VPN SID).

7. The device according to claim 1, wherein the IPv6 packet comprises an identifier field, and the identifier field indicates whether the IPv6 packet has been processed according to a group based policy corresponding to the EPG information.

8. A second network device, applied to an Internet Protocol version 6 (IPv6) network, and the second network device comprising:
at least one processor; and
a non-transitory computer readable storage medium storing a program that is executable by the at least one processor, the program including instructions to:
receive an IPv6 packet, wherein the IPv6 packet comprises an IPv6 extension header and an original packet, and the IPv6 extension header comprises endpoint group (EPG) information;
obtain the EPG information from the IPv6 extension header; and
process the IPv6 packet according to a group based policy corresponding to the EPG information.

9. The device according to claim 8, wherein the EPG information comprises at least one of first EPG information or second EPG information, the first EPG information identifies an EPG to which a first computing device belongs, a source Internet Protocol (IP) address of the original packet comprises an IP address of the first computing device, the second EPG information identifies an EPG to which a second computing device belongs, and a destination IP address of the original packet comprises an IP address of the second computing device.

10. The device according to claim 8, wherein the IPv6 extension header comprises at least one of a hop-by-hop options header or a destination options header, and at least one of the hop-by-hop options header or the destination options header comprises the EPG information.

11. The device according to claim 8, wherein the program further includes instructions to obtain the group based policy based on the EPG information.

12. The device according to claim 8, wherein the IPv6 extension header comprises a type length value (TLV), and the EPG information is located in a value field of the TLV.

13. The device according to claim 8, wherein the IPv6 extension header comprises one or more options, and the EPG information comprises first EPG information and second EPG information; and
wherein the first EPG information and the second EPG information are respectively located in different options of the IPv6 extension header.

14. The device according to claim 8, wherein the IPv6 packet comprises an outer IPv6 header of the original packet, and a destination internet protocol (IP) address of the IPv6 header comprises a virtual private network segment identifier (VPN SID).

15. The device according to claim 8, wherein the IPv6 packet comprises an identifier field, the identifier field indicates whether the IPv6 packet has been processed according to the group based policy corresponding to the EPG information, and the program further includes instructions to:
determine, based on a value of the identifier field, that the IPv6 packet has not been processed according to the group based policy.

16. The device according to claim 15, wherein the program further includes instructions to:
update the value of the identifier field.

17. A network system, comprising:
a first network device; and
a second network device;
wherein the first network device is configured to:
receive an original packet;
generate an IPv6 packet based on the original packet and endpoint group (EPG) information, wherein the IPv6 packet comprises an IPv6 extension header and the original packet, and the IPv6 extension header comprises the EPG information; and
send the IPv6 packet; and
wherein the second network device is configured to:
receive the IPv6 packet;
obtain the EPG information from the IPv6 extension header; and
process the IPv6 packet according to a group based policy corresponding to the EPG information.

18. The network system according to claim 17, wherein the EPG information comprises at least one of first EPG information or second EPG information, the first EPG information identifies an EPG to which a first computing device belongs, a source Internet Protocol (IP) address of the original packet comprises an IP address of the first computing device, the second EPG information identifies an EPG to which a second computing device belongs, and a destination IP address of the original packet comprises an IP address of the second computing device.

19. The network system according to claim 17, wherein the IPv6 extension header comprises at least one of a hop-by-hop options header or a destination options header, and at least one of the hop-by-hop options header or the destination options header comprises the EPG information.

20. The network system according to claim 17, wherein the IPv6 extension header comprises a type length value (TLV), and the EPG information is located in a value field of the TLV.

* * * * *